(12) United States Patent
Venkata et al.

(10) Patent No.: US 9,565,099 B2
(45) Date of Patent: Feb. 7, 2017

(54) SPANNING TREE IN FABRIC SWITCHES

(71) Applicant: BROCADE COMMUNICATIONS SYSTEMS, INC., San Jose, CA (US)

(72) Inventors: Ganesh D. Venkata, San Jose, CA (US); Amit Gupta, Fremont, CA (US); Prabu Thayalan, Bangalore (IN); Vardarajan Venkatesh, Santa Clara, CA (US); Mythilikanth Raman, San Jose, CA (US); Selvam Muthiah, Santa Clara, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 228 days.

(21) Appl. No.: 14/192,751

(22) Filed: Feb. 27, 2014

(65) Prior Publication Data

US 2014/0247754 A1 Sep. 4, 2014

Related U.S. Application Data

(60) Provisional application No. 61/771,723, filed on Mar. 1, 2013.

(51) Int. Cl.
| | |
|---|---|
| *H04L 12/28* | (2006.01) |
| *H04L 12/56* | (2006.01) |
| *H04L 12/753* | (2013.01) |
| *H04L 12/46* | (2006.01) |
| *H04L 12/931* | (2013.01) |

(52) U.S. Cl.
CPC ............ *H04L 45/48* (2013.01); *H04L 12/462* (2013.01); *H04L 49/70* (2013.01)

(58) Field of Classification Search
CPC .......... H04L 45/48; H04L 12/462; H04L 49/70
See application file for complete search history.

(56) References Cited

U.S. PATENT DOCUMENTS

| | | | |
|---|---|---|---|
| 5,390,173 | A | 2/1995 | Spinney |
| 5,802,278 | A | 9/1998 | Isfeld |
| 5,878,232 | A | 3/1999 | Marimuthu |

(Continued)

FOREIGN PATENT DOCUMENTS

| | | |
|---|---|---|
| CN | 102801599 A | 11/2012 |
| EP | 0579567 A2 | 1/1994 |

(Continued)

OTHER PUBLICATIONS

Huang, Nen-Fu et al. "An Effective Spanning Tree Algorithm for a Bridged LAN", Mar. 16, 1992.

(Continued)

*Primary Examiner* — Lonnie Sweet
(74) *Attorney, Agent, or Firm* — Shun Yao; Park, Vaughan, Fleming & Dowler LLP

(57) ABSTRACT

One embodiment of the present invention provides a switch. The switch includes a packet processor and a spanning tree management module. The packet processor obtains information associated with a spanning tree from a message. The spanning tree management module, in response to the obtained information being superior to locally available information of the spanning tree, determines the port role of a local port of the switch for the spanning tree to be the root port and the port state of the local port for the spanning tree to be blocking.

33 Claims, 17 Drawing Sheets

(56) References Cited

U.S. PATENT DOCUMENTS

| | | |
|---|---|---|
| 5,879,173 A | 3/1999 | Poplawski |
| 5,959,968 A | 9/1999 | Chin |
| 5,973,278 A | 10/1999 | Wehrll, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 * | 8/2004 | Seaman ............... H04L 12/4625 370/254 |
| 6,873,602 B1 | 3/2005 | Ambe |
| 6,937,576 B1 * | 8/2005 | Di Benedetto ....... H04L 12/462 370/256 |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan et al. |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | Jha |
| 8,599,864 B2 | 12/2013 | Chung |
| 8,615,008 B2 | 12/2013 | Natarajan |
| 8,706,905 B1 | 4/2014 | McGlaughlin |
| 8,724,456 B1 | 5/2014 | Hong |
| 8,798,045 B1 | 8/2014 | Aybay |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,995,272 B2 | 3/2015 | Agarwal |
| 9,350,680 B2 | 5/2016 | Thayalan |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0091795 A1 | 7/2002 | Yip |
| 2003/0041085 A1 | 2/2003 | Sato |
| 2003/0093567 A1 | 5/2003 | Lolayekar |
| 2003/0097464 A1 | 5/2003 | Martinez |
| 2003/0123393 A1 | 7/2003 | Feuerstraeter |
| 2003/0147385 A1 | 8/2003 | Montalvo |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0008868 A1 | 1/2004 | Bornowski |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |

(56) References Cited

U.S. PATENT DOCUMENTS

| | | |
|---|---|---|
| 2004/0205234 A1 | 10/2004 | Barrack |
| 2004/0213232 A1 | 10/2004 | Regan |
| 2004/0243673 A1 | 12/2004 | Goyal |
| 2005/0007951 A1 | 1/2005 | Lapuh |
| 2005/0044199 A1 | 2/2005 | Shiga |
| 2005/0074001 A1 | 4/2005 | Mattes et al. |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0122979 A1 | 6/2005 | Gross |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0098589 A1 | 5/2006 | Kreeger |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1* | 8/2007 | Narayanan ............ H04L 49/357 370/216 |
| 2007/0211712 A1 | 9/2007 | Fitch |
| 2007/0220059 A1 | 9/2007 | Lu |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0057918 A1 | 3/2008 | Abrant |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens et al. |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0138577 A1 | 5/2009 | Casado |
| 2009/0138752 A1 | 5/2009 | Graham |
| 2009/0144720 A1 | 6/2009 | Roush |
| 2009/0161584 A1* | 6/2009 | Guan .................... H04L 12/462 370/256 |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0042869 A1 | 2/2010 | Szabo |
| 2010/0046471 A1 | 2/2010 | Hattori |
| 2010/0054260 A1 | 3/2010 | Pandey |

(56) References Cited

U.S. PATENT DOCUMENTS

| | | |
|---|---|---|
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0254703 A1 | 10/2010 | Kirkpatrick |
| 2010/0257263 A1 | 10/2010 | Casado |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0055274 A1 | 3/2011 | Scales et al. |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe et al. |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Da Silva |
| 2012/0033668 A1 | 2/2012 | Humphries |
| 2012/0033669 A1 | 2/2012 | Mohandas |
| 2012/0033672 A1 | 2/2012 | Page |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0177039 A1 | 7/2012 | Berman |
| 2012/0210416 A1 | 8/2012 | Mihelich |
| 2012/0221636 A1 | 8/2012 | Surtani |
| 2012/0239918 A1 | 9/2012 | Huang |
| 2012/0243539 A1 | 9/2012 | Keesara |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0066947 A1 | 3/2013 | Ahmad |
| 2013/0067466 A1 | 3/2013 | Combs |
| 2013/0070762 A1 | 3/2013 | Adams |

(56) References Cited

U.S. PATENT DOCUMENTS

| | | |
|---|---|---|
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0132296 A1 | 5/2013 | Koppenhagen |
| 2013/0135811 A1 | 5/2013 | Dunwoody |
| 2013/0136123 A1 | 5/2013 | Ge |
| 2013/0148546 A1 | 6/2013 | Eisenhauer |
| 2013/0156425 A1 | 6/2013 | Kirkpatrick |
| 2013/0194914 A1 | 8/2013 | Agarwal |
| 2013/0219473 A1 | 8/2013 | Schaefer |
| 2013/0223449 A1 | 8/2013 | Koganti |
| 2013/0250951 A1 | 9/2013 | Koganti |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315586 A1 | 11/2013 | Kipp |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0064056 A1 | 3/2014 | Sakata |
| 2014/0105034 A1 | 4/2014 | Sun |
| 2014/0157251 A1 | 6/2014 | Hocker |
| 2014/0298091 A1 | 10/2014 | Carlen |
| 2015/0010007 A1 | 1/2015 | Matsuhira |
| 2015/0030031 A1 | 1/2015 | Zhou |
| 2015/0127618 A1 | 5/2015 | Alberti |
| 2015/0143369 A1 | 5/2015 | Zheng |
| 2015/0195093 A1 | 7/2015 | Mahadevan et al. |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |

FOREIGN PATENT DOCUMENTS

| | | |
|---|---|---|
| EP | 0993156 A2 | 12/2000 |
| EP | 1398920 A2 | 3/2004 |
| EP | 2001167 A1 | 8/2007 |
| EP | 1916807 A2 | 10/2007 |
| WO | 2008056838 | 5/2008 |
| WO | 2009042919 | 4/2009 |
| WO | 2010111142 A1 | 9/2010 |
| WO | 2014031781 | 2/2014 |

OTHER PUBLICATIONS

Zhai, H. et al., "RBridge: Pseudo-Nickname draft-hu-trill-pseudonode-nickname-02.", May 15, 2012.
Narten, T. et al. "Problem Statement: Overlays for Network Virtualization draft-narten-nvo3-overlay-problem-statement-01", Oct. 31, 2011.
Knight, Paul et al. "Layer 2 and 3 Virtual Private Networks: Taxonomy, Technology, and Standardization Efforts", 2004.
An Introduction to Brocade VCS Fabric Technology, Dec. 3, 2012.
Kreeger, L. et al. "Network Virtualization Overlay Control Protocol Requirements draft-kreeger-nvo3-overlay-cp-00", Aug. 2, 2012.
Knight, Paul et al., "Network based IP VPN Architecture using Virtual Routers", May 2003.
Louati, Wajdi et al., "Network-Based Virtual Personal Overlay Networks Using Programmable Virtual Routers", 2005.
Brocade Unveils "The Effortless Network", 2009.
The Effortless Network: HyperEdge Technology for the Campus LAN, 2012.
Foundary FastIron Configuration Guide, Software Release FSX 04.2.00b, Software Release FWS 04.3.00, Software Release FGS 05.0.00a, 2008.
FastIron and TurbuIron 24x Configuration Guide, 2010.
FastIron Configuration Guide, Supporting IronWare Software Release 07.0.00, 2009.
Christensen, M. et al., Considerations for Internet Group Management Protocol (IGMP) and Multicast Listener Discovery (MLD) Snooping Switches, 2006.
Perlman, Radia et al. "RBridges: Base Protocol Specification", <draft-ietf-trill-rbridge-protocol-16.txt>, 2010.
Brocade Fabric OS (FOS) 6.2 Virtual Fabrics Feature Frequently Asked Questions, 2009.
Eastlake III, Donald et al., "RBridges: TRILL Header Options", 2009.
Perlman, Radia "Challenges and Opportunities in the Design of TRILL: a Routed layer 2 Technology", 2009.
Perlman, Radia et al., "RBridge VLAN Mapping", <draft-ietf-trill-rbridge-vlan-mapping-01.txt>, 2009.
Knight, S. et al., "Virtual Router Redundancy Protocol", 1998.
"Switched Virtual Internetworking moves beyond bridges and routers", 8178 Data Communications 23(1994) September No. 12.
Touch, J. et al., "Transparent Interconnection of Lots of Links (TRILL): Problem and Applicability Statement", 2009.
Lapuh, Roger et al., "Split Multi-link Trunking (SMLT)", 2002.
Lapuh, Roger et al., "Split Multi-Link Trunking (SMLT) draft-Lapuh-network-smlt-08", 2009.
Nadas, S. et al., "Virtual Router Redundancy Protocol (VRRP) Version 3 for IPv4 and IPv6", 2010.
Office action dated Sep. 12, 2012, U.S. Appl. No. 12/725,249, filed Mar. 16, 2010.
Office action dated Apr. 26, 2012, U.S. Appl. No. 12/725,249, filed Mar. 16, 2010.
Office action dated Dec. 5, 2012, U.S. Appl. No. 13/087,239, filed Apr. 14, 2011.
Office action dated May 22, 2013, U.S. Appl. No. 13/087,239, filed Apr. 14, 2011.
Office action dated Dec. 21, 2012, U.S. Appl. No. 13/098,490, filed May 2, 2011.
Office action dated Jul. 9, 2013, U.S. Appl. No. 13/098,490, filed May 2, 2011.
Office action dated Mar. 27, 2014, U.S. Appl. No. 13/098,490, filed May 2, 2011.
Office action dated Feb. 5, 2013, U.S. Appl. No. 13/092,724, filed Apr. 22, 2011.
Office action dated Jul. 16, 2013, U.S. Appl. No. 13/092,724, filed Jul. 16, 2013.
Office action dated Apr. 9, 2014, U.S. Appl. No. 13/092,724, filed Apr. 22, 2011.
Office action dated Jun. 10, 2013, U.S. Appl. No. 13/092,580, filed Apr. 22, 2011.
Office action dated Jan. 10, 2014, U.S. Appl. No. 13/092,580, filed Apr. 22, 2011.
Office action dated Mar. 18, 2013, U.S. Appl. No. 13/042,259, filed Mar. 7, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jun. 21, 2013, U.S. Appl. No. 13/092,460, filed Apr. 22, 2011.
Office action dated Mar. 14, 2014, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.

(56) References Cited

OTHER PUBLICATIONS

Office action dated Mar. 26, 2014, U.S. Appl. No. 13/092,701, filed Apr. 22, 2011.
Office action dated Feb. 5, 2013, U.S. Appl. No. 13/092,752, filed Apr. 22, 2011.
Office action dated Jul. 18, 2013, U.S. Appl. No. 13/092,752, filed Apr. 22, 2011.
Office action dated Apr. 9, 2014, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Mar. 4, 2013, U.S. Appl. No. 13/092,877, filed Apr. 22, 2011.
Office action dated Sep. 5, 2013, U.S. Appl. No. 13/092,877, filed Apr. 22, 2011.
Office action dated Jan. 6, 2014, U.S. Appl. No. 13/092,877, filed Apr. 22, 2011.
Office action dated Jun. 20, 2014, U.S. Appl. No. 13/092,877, filed Apr. 22, 2011.
Office action dated Jun. 7, 2012, U.S. Appl. No. 12/950,968, filed Nov. 19, 2010.
Office action dated Jan. 4, 2013, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Jun. 11, 2013, U.S. Appl. No. 13/030,806, filed Feb. 18, 2011.
Office action dated Apr. 22, 2014, U.S. Appl. No. 13/030,806, filed Feb. 18, 2011.
Office action dated Apr. 25, 2013, U.S. Appl. No. 13/030,688, filed Feb. 18, 2011.
Office action dated Jun. 11, 2013, U.S. Appl. No. 13/044,301, filed Mar. 9, 2011.
Office action dated Feb. 22, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Dec. 2, 2013, U.S. Appl. No. 13/184,526, filed Jul. 16, 2011.
Office action dated Jun. 19, 2013, U.S. Appl. No. 13/092,873, filed Apr. 22, 2011.
Office action dated Nov. 29, 2013, U.S. Appl. No. 13/092,873, filed Apr. 22, 2011.
Office action dated Jul. 23, 2013, U.S. Appl. No. 13/365,993, filed Feb. 3, 2012.
Office action dated Jul. 18, 2013, U.S. Appl. No. 13/365,808, filed Feb. 3, 2012.
Office action dated Mar. 6, 2014, U.S. Appl. No. 13/425,238, filed Mar. 20, 2012.
Office action dated Jun. 13, 2013, U.S. Appl. No. 13/312,903, filed Dec. 6, 2011.
Office action dated Nov. 12, 2013, U.S. Appl. No. 13/312,903, filed Dec. 6, 2011.
Office action dated Jun. 18, 2014, U.S. Appl. No. 13/440,861, filed Apr. 5, 2012.
Office action dated Feb. 28, 2014, U.S. Appl. No. 13/351,513, filed Jan. 17, 2012.
Office action dated May 9, 2014, U.S. Appl. No. 13/484,072, filed May 30, 2012.
Office action dated Oct. 21, 2013, U.S. Appl. No. 13/533,843, filed Jun. 26, 2012.
Office action dated May 14, 2014, U.S. Appl. No. 13/533,843, filed Jun. 26, 2012.
Office action dated Feb. 20, 2014, U.S. Appl. No. 13/598,204, filed Aug. 29, 2012.
Office action dated Jun. 6, 2014, U.S. Appl. No. 13/669,357, filed Nov. 5, 2012.
Office action dated Jul. 7, 2014, U.S. Appl. No. 13/044,326, filed Mar. 9, 2011.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438 filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Rosen, E. et al., "BGP/MPLS VPNs", Mar. 1999.
Office Action for U.S. Appl. No. 14/577,785, filed Dec. 19, 2014, dated Apr. 13, 2015.
Office Action for U.S. Appl. No. 13/786,328, filed Mar. 5, 2013, dated Mar. 13, 2015.
Office Action for U.S. Appl. No. 13/425,238, filed Mar. 20, 2012, dated Mar. 12, 2015.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada, year dated:2000.
'An Introduction to Brocade VCS Fabric Technology', BROCADE white paper, http://community.brocade.com/docs/DOC-2954, Dec. 3, 2012.
U.S. Appl. No. 13/030,806 Office Action dated Dec. 3, 2012.
Brocade, 'FastIron and TurboIron 24x Configuration Guide', Feb. 16, 2010.
Brocade 'Brocade Unveils 'The Effortless Network'", http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.

(56) References Cited

OTHER PUBLICATIONS

Office Action for U.S. Appl. No. 13/030,688, filed Feb. 18, 2011, dated Apr. 25, 2013.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Office Action for U.S. Appl. No. 13/092,887, dated Jan. 6, 2014.
'RBridges: Base Protocol Specification', IETF Draft, Perlman et al., Jun. 26, 2009.
Office Action for U.S. Appl. No. 13/030,806, filed Feb. 18, 2011, dated Dec. 3, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, dated Dec. 2, 2012.
Office Action for U.S. Appl. No. 13/087,239, filed Apr. 14, 2011, dated Dec. 5, 2012.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
McKeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Office Action dated Jun. 18, 2015, U.S. Appl. No. 13/098,490, filed May 2, 2011.
Office Action dated Jun. 16, 2015, U.S. Appl. No. 13/048,817, filed Mar. 15, 2011.
Touch, J. et al., 'Transparent Interconnection of Lots of Links (TRILL): Problem and Applicability Statement', May 2009, Network Working Group, pp. 1-17.

(56) References Cited

OTHER PUBLICATIONS

Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.

\* cited by examiner

NODE ROOT PRIORITY VECTOR DATA STRUCTURE 150

| SWITCH ROLE 152 | ROOT SWITCH ID 156 | ROOT PATH COST 158 | DESIGNATED SWITCH ID 160 | DESIGNATED PORT ID 162 | PORT ID 164 |
|---|---|---|---|---|---|

NODE ROOT PRIORITY TABLE 170

| | | SWITCH ID OF SWITCH 104 | ROOT PATH COST TO SWITCH 116 | SWITCH ID SWITCH 106 | PORT ID OF PORT 126 | PORT ID 192 OF PORT 122 |
|---|---|---|---|---|---|---|
| SWITCH ID 182 OF SWITCH 116 | DESIGNATED | | | | | |
| SWITCH ID 184 OF SWITCH 118 | BLOCKED | SWITCH ID OF SWITCH 104 | ROOT PATH COST TO SWITCH 118 | SWITCH ID SWITCH 108 | PORT ID OF PORT 128 | PORT ID 194 OF PORT 124 |

PORT IDENTIFIER ALLOCATION TABLE 350

| PORT IDENTIFIER 352 | INTERFACE NAME 354 | STATUS 356 |
|---|---|---|
| PORT ID 192 | 182 (SWITCH ID)/372 (LC NO.)/382 (PORT NO.) | STALE |
| PORT ID 194 | 184/374/384 | ACTIVE |
| PORT ID 392 | 382/376/386 | ACTIVE |

SPANNING TREE IN FABRIC SWITCHES

RELATED APPLICATIONS

This application claims the benefit of U.S. Provisional Application No. 61/771,723, titled "Facilitating Spanning Tree Protocol in a Fabric Switch," by inventors Ganesh D. Venkata, Amit Gupta, Prabu Thayalan, Vardarajan Venkatesh, Mythilikanth Raman, and Selvam Muthiah, filed 1 Mar. 2013, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, and U.S. patent application Ser. No. 12/725,249, titled "Redundant Host Connection in a Routed Network," by inventors Somesh Gupta, Anoop Ghanwani, Phanidhar Koganti, and Shunjia Yu, filed 16 Mar. 2010, the disclosures of which are incorporated by reference herein.

BACKGROUND

Field

The present disclosure relates to network management. More specifically, the present disclosure relates to a method and system for efficiently facilitating external spanning tree support for a fabric switch.

Related Art

The growth of the Internet has brought with it an increasing demand for bandwidth. As a result, equipment vendors race to build larger and faster switches, each capable of supporting a large number of end devices, to move more traffic efficiently. However, the size of a switch cannot grow infinitely. It is limited by physical space, power consumption, and design complexity, to name a few factors. One way to meet this challenge is to interconnect a number of switches to support a large number of users. Interconnecting such a large number of switches in a layer-3 network requires tedious and complex configurations on a respective switch, typically performed by a network administrator. Such configuration includes assigning an address for a respective interface (e.g., a port) and configuring routing protocols for the switch. These issues can be solved by interconnecting switches in layer-2.

One way to increase the throughput of a switch system is to use switch stacking. In switch stacking, multiple smaller-scale, identical switches are interconnected in a special pattern to form a larger logical switch. The amount of required manual configuration and topological limitations for switch stacking becomes prohibitively tedious when the stack reaches a certain size, which precludes switch stacking from being a practical option in building a large-scale switching system.

As layer-2 (e.g., Ethernet) switching technologies continue to evolve, more routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While coupling switches in an arbitrary topology brings many desirable features to a network, some issues remain unsolved for facilitating external spanning tree support.

SUMMARY

One embodiment of the present invention provides a switch. The switch includes a packet processor and a spanning tree management module. The packet processor obtains information associated with a spanning tree from a message. The spanning tree management module, in response to the obtained information being superior to locally available information of the spanning tree, determines the port role of a local port of the switch for the spanning tree to be the root port and the port state of the local port for the spanning tree to be blocking.

In a variation on this embodiment, the switch includes a notification module which generates a notification message for a remote switch comprising the obtained information.

In a variation on this embodiment, the spanning tree management module changes the port state of the local port for the spanning tree to be forwarding in response to an approval from a remote switch.

In a variation on this embodiment, if the switch receives superior information of the spanning tree from a message from a remote switch, the spanning tree management module re-determines the port role of the local port for the spanning tree. It should be noted that the message is not a control message of the spanning tree.

In a variation on this embodiment, the spanning tree management module stores the best locally available information of the spanning tree in a local node root priority vector and the best information of the spanning tree associated with a remote switch in a local node root priority table.

In a variation on this embodiment, the switch also includes a fabric switch management module which maintains a membership in a fabric switch. The fabric switch is configured to accommodate a plurality of switches and operates as a single switch. The spanning tree management module represents the fabric switch as a single switch in the spanning tree.

In a further variation, the switch also includes a port management module which assigns a port identifier to the local port. This port identifier is unique among the edge ports of the fabric switch. The spanning tree management module uses the port identifier to participate in the spanning tree, thereby facilitating the local port to appear as a port of the single switch represented by the fabric switch.

In a further variation, the port management module stores the port identifier in an entry of a port identifier allocation table of the switch. If a status update event occurs for the switch, the port management module marks the entry as stale. Other member switches of the fabric switch are precluded from assigning this stale entry to an edge port.

In a further variation, if the effect of the status update event ends, the port management module reassigns the port identifier to the local port.

In a further variation, if a limit of the number of port identifiers has been reached and the stale entry meets one or more reallocation criteria, the port management module reassigns the port identifier of the stale entry to a second port.

In a further variation, the reallocation criteria include: (i) an age of a stale entry, and (ii) an indication whether an entry is stale due to a configured event or a learned event.

In a further variation, if a limit of the number of port identifiers has been reached and a stale entry in the port identifier allocation table is unavailable, the port management module precludes the switch from enabling the spanning tree for a local port.

In a further variation, the fabric switch management module also determines a first switch identifier for the fabric switch. This first switch identifier is distinct from a second switch identifier associated with a second fabric switch. This distinction between the first and the second switch identifiers is based on a random number or a configured number In a variation on this embodiment, the switch also includes a link aggregation module which operates the local port in conjunction with a second port of a remote switch as a single logical port of a virtual link aggregation. The link aggregation module also selects a master switch between the switch and the remote switch. The master switch includes a selected port between the local port and the second port. This selected port actively participates in the spanning tree as representative of the logical port.

In a further variation, the link aggregation module selects the master switch based on whether a switch has received the most recent control message of the spanning tree.

In a further variation, the link aggregation module selects the master switch further based on whether a first identifier associated with the switch and the remote switch is inferior to a second identifier. The first identifier is associated with a first fabric switch and the second identifier is associated with a second fabric switch. A fabric switch is configured to accommodate a plurality of switches and operates as a single switch

BRIEF DESCRIPTION OF THE FIGURES

FIG. 1B illustrates an exemplary node root priority vector data structure for facilitating distributed spanning tree port state determination, in accordance with an embodiment of the present invention.

FIG. 1C illustrates an exemplary node root priority table for facilitating distributed spanning tree port state determination, in accordance with an embodiment of the present invention.

FIG. 3B illustrates an exemplary port identifier allocation table for retentive port identifier assignment in a fabric switch, in accordance with an embodiment of the present invention.

DETAILED DESCRIPTION

Figure 1A:
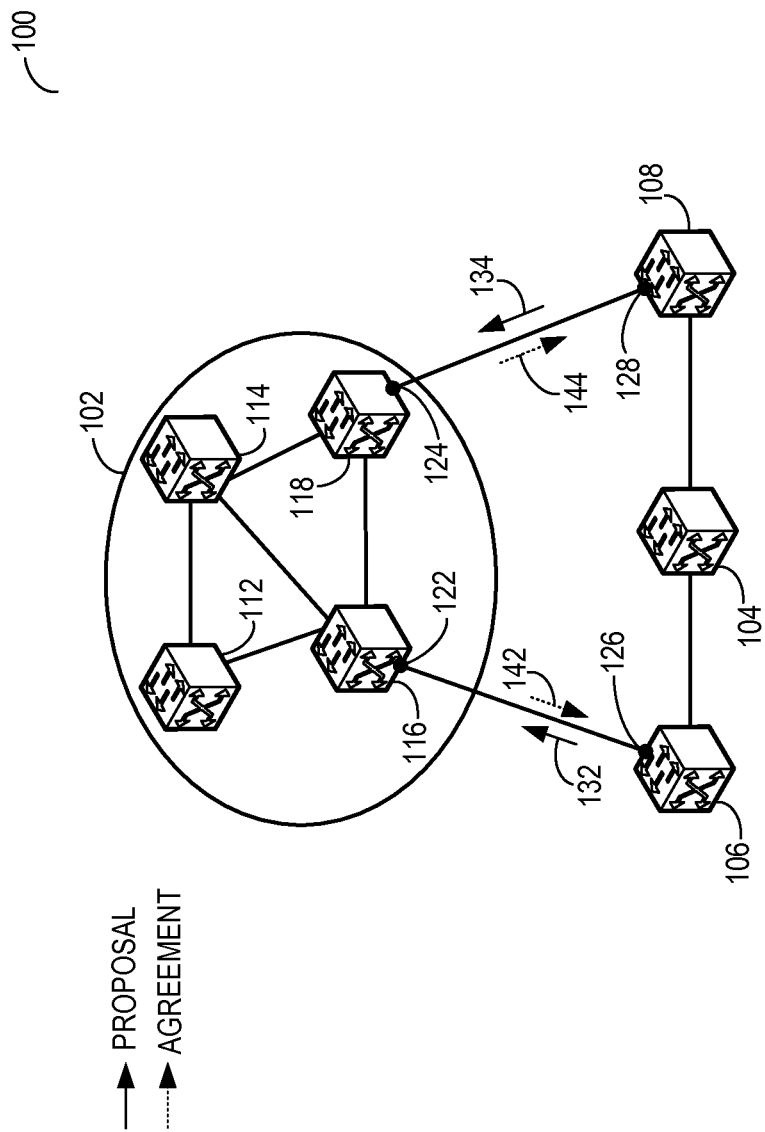
FIG. 1A illustrates an exemplary fabric switch with distributed spanning tree port state determination, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of a fabric switch participating in an external spanning tree as a single switch is solved by running a distributed spanning tree protocol for the edge ports in a respective member switch of the fabric switch. In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-andplay" mode without any manual configuration. In some embodiments, a respective switch in the fabric switch is a Transparent Interconnection of Lots of Links (TRILL) routing bridge (RBridge).

When three or more switches and devices are coupled in a layer-2 network (e.g., Ethernet), there can be a layer-2 external loop (i.e., a loop created by external connectivity of a switch) among these switches. To break this external loop, a respective switch runs a spanning tree protocol, which determines the port state (e.g., blocking or forwarding) of a respective port of the switch. The forwarding ports actively participate in the spanning tree while the blocking ports do not forward packets via the spanning tree.

However, the spanning tree protocol is typically designed for individual switches locally deciding the port state. Because the fabric switch externally appears as a single switch, the fabric switch participates in the spanning tree, which is external to the fabric switch, as a single switch. Consequently, the member switches cannot make local decisions, and may need extensive and delay-prone synchronization to decide the port state of the edge ports. Other challenges include spanning tree re-convergence without topology change due to the return of the member switch to the fabric switch, identifier conflict among neighboring fabric switches, and inefficient forwarding via the edge ports in a virtual link aggregation (VLAG).

To solve this problem of a fabric switch participating in an external spanning tree as a single switch, a distributed spanning tree protocol for the edge ports in a respective member switch of the fabric switch determines the port state of the edge ports. This distributed spanning tree protocol facilitates synchronized spanning tree port state identification of the edge ports of a respective member switch of the fabric switch. The efficiency of the distributed spanning tree is further enhanced by assigning respective retentive port identifiers to the edge ports. When a member switch leaves and returns to a fabric switch, the corresponding edge ports retain the same respective port identifiers and do not cause the spanning tree to re-converge.

Furthermore, a unique layer-2 identifier is assigned to a respective fabric switch. As a result, when a plurality of fabric switches are coupled to each other, a respective fabric switch can participate in the external spanning tree protocol as a respective single switch without causing a conflict. Moreover, a plurality of the edge ports, which are in different member switches (these member switches are referred to as partner switches), can participate in a virtual link aggregation. The edge port which receives the most recent control packet is selected to participate in the external spanning tree; thus the port which provides the most efficient forwarding via the spanning is selected.

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

Although the present disclosure is presented using examples based on the layer-2 communication protocol, embodiments of the present invention are not limited to layer-2 networks. Embodiments of the present invention are relevant to any networking protocol which requires a loop-free network topology. In this disclosure, the term "layer-2 network" is used in a generic sense, and can refer to any networking layer, sub-layer, or a combination of networking layers below layer-3 (e.g., the network layer in the Internet protocol stack).

The term "RBridge" refers to routing bridges, which are bridges implementing the TRILL protocol as described in IETF Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the term "end device" can refer to a host machine, a conventional layer-2 switch, or any other type of network device. Additionally, an end device can be coupled to other switches or hosts further away from a layer-2 network. An end device can also be an aggregation point for a number of network devices to enter the layer-2 network.

The term "edge port" refers to a port on a fabric switch which exchanges data frames with a network device outside of the fabric switch (i.e., an edge port is not used for exchanging data frames with another member switch of a fabric switch). In a generic sense, the term "port" can refer to any interface of a switch, including an "edge port." The term "inter-switch port" refers to a port which sends/receives data frames among member switches of a fabric switch. The terms "interface" and "port" are used interchangeably.

The term "switch identifier" refers to a group of bits that can be used to identify a switch. Examples of a switch identifier include, but are not limited to, a MAC address, an Internet Protocol (IP) address, and an RBridge identifier. Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "frame" refers to a group of bits that can be transported together across a network. "Frame" should not be interpreted as limiting embodiments of the present invention to layer-2 networks. "Frame" can be replaced by other terminologies referring to a group of bits, such as "message," "packet," "cell," or "datagram."

The term "loop" is used in a generic sense, and it can refer to any number of standalone and fabric switches coupled to each other in such a way that at least one of the switches may receive a frame previously originated from the same switch. The term "external loop" refers to a network loop formed based on the external connectivity of a switch. For a fabric switch, an external loop is formed by the edge interfaces. The terms "external loop" and "loop" are used interchangeably in a generic sense. The term "loop breaking" refers to disabling an interface or a link between two switches belonging to a loop in so that the loop does not exist any longer.

The term "spanning tree protocol" is used in a generic sense, and can refer to any protocol that creates a spanning tree in a network. Such a protocol can be distributed or centralized. Examples of such protocols include, but are not limited to, Spanning Tree Protocol (STP), Rapid Spanning Tree Protocol (RSTP) and Multiple Spanning Tree Protocol (MSTP). The term "spanning tree" is also used in a generic sense, and can refer to any loop-free topology in a network.

The term "fabric switch" refers to a number of interconnected physical switches which form a single, scalable logical switch. In a fabric switch, any number of switches can be connected in an arbitrary topology and the entire group of switches functions together as one single switch. This feature makes it possible to use many smaller, inexpensive switches to construct a large fabric switch, which can be viewed externally as a single switch.

Network Architecture

FIG. 1A illustrates an exemplary fabric switch with distributed spanning tree port state determination, in accordance with an embodiment of the present invention. As illustrated in FIG. 1A, a layer-2 network 100 (e.g. Ethernet) includes fabric switch 102, and switches 104, 106, and 108. Fabric switch 102 includes member switches 112, 114, 116, and 118. In some embodiments, one or more switches, including one or more member switches of fabric switch 102, in network 100 can be virtual switches (e.g., a software switch running on a computing device).

In some embodiments, fabric switch 102 is a TRILL network and a respective member switch of fabric switch 102, such as switch 116, is a TRILL RBridge. Switches in fabric switch 102 use edge ports to communicate with end devices (e.g., non-member switches) and inter-switch ports to communicate with other member switches. For example, switch 116 is coupled to switch 106 via an edge port and to switches 112, 114, and 118 via inter-switch ports and one or more links. Data communication via an edge port can be based on Ethernet and via an inter-switch port can be based on TRILL protocol. It should be noted that control message exchange via inter-switch ports can be based on a different protocol (e.g., Internet Protocol (IP) or Fibre Channel (FC) protocol).

In network 100, member switches 116 and 118 of fabric switch 102 are coupled to switches 106 and 108, respectively. Switches 106 and 108 are further coupled to switch 104 and form a loop in network 100. This loop is external to fabric switch 102 and may not be relevant to internal communication of fabric switch 102 (e.g., among the member switches). To break the loop, switches 102, 104, 106, and 108 participate in a spanning tree. Fabric switch 102 operates as a single switch and appears as a single switch to switches 104, 106, and 108. Hence, fabric switch 102 participates in the spanning tree protocol as a single switch.

A respective edge port for which spanning tree has been enabled can participate in the spanning tree protocol. A respective member switch of fabric switch 102 runs a distributed spanning tree algorithm for these edge ports. To facilitate the operations of the distributed spanning tree algorithm, a respective edge port of fabric switch 102 for which spanning tree is enabled is assigned a port identifier. This port identifier is unique across fabric switch 102. In this way, a respective port is uniquely identified to external end devices. For example, port 122 of switch 116 and port 124 of switch 118 may have the same local identifier but the fabric-wide port identifiers for ports 122 and 124 are unique. As a result, switch 106 or 108 can uniquely identify the port of fabric switch 102 with which switch 106 or 108 is communicating.

Suppose that switch 104 is the root switch for the spanning tree. During operation, switches 106 and 108 receive a proposal message comprising spanning tree information, such as the path cost to root switch 104. If the information received is superior to the information available at switches 106 and 108 (e.g., has a lower path cost to root 104 and/or a designated switch identifier with a lower value), these switches respond via respective receiving ports with corresponding agreement messages. These ports become the root ports of switches 106 and 108 for the spanning tree. In other words, the port role assigned to these ports is root port. In some embodiments, the proposal and agreement messages are respective Bridge Protocol Data Units (BPDUs). A BPDU can include the root switch identifier, the path cost from the sender switch to the root switch, an identifier of the sender switch, and an identifier of the port via which the BPDU has been sent.

However, when switches 106 and 108 select the port role to be root port, switches 106 and 108 send proposal messages to downstream switches via downstream ports 126 and 128, respectively, and put all other ports (ports other than the root port and the downstream port) in a blocking state. Examples of a blocking state include, but are not limited to, a blocking state when a port does not send or receive any user data, a listening state when a port receives BPDUs, but does not learn media access control (MAC) addresses or forward data, and a learning state when a port learns MAC addresses but does not forward data. If switch 106 does not receive an agreement message back via port 126, switch 106 can put port 126 in a blocking state as well. Similarly, if switch 108 does not receive an agreement message back via port 128, switch 108 can put port 128 in a blocking state.

Switch 106 sends a proposal message 132 comprising the path cost to root switch 104 to member switch 116. Switch 116 receives proposal message 132 via port 122. Similarly, switch 108 sends a proposal message 134 comprising the path cost to root switch 104 to member switch 118. Switch 118 receives proposal message 134 via port 124. Without running the distributed spanning tree algorithm, if the received information is superior to the information available at switches 116 and 118, these switches respond via ports 122 and 124, respectively, with corresponding agreement messages. Then both ports 122 and 124 become root ports. In other words, the port role assigned to ports 122 and 124 is root port.

However, because switches 116 and 118 are member switches of fabric switch 102, which participates in the spanning tree as a single switch, if both ports 122 and 124 become root ports, the loop persists. On the other hand, if switch 116 or 118 exchanges information via internal messaging with all other member switches to determine whether port 122 or 124, respectively, is the superior port in the entire fabric switch 102, there can be a delay due to the internal messaging. Meanwhile, because switches 106 and 108 may run a standard spanning tree protocol, switches 106 and 108 expect agreement messages via ports 126 and 128, respectively. Due to the delay, switches 106 and 108 may time out proposal messages 132 and 134, and put ports 126 and 128, respectively, in a blocking state.

To solve this problem, a respective member switch of fabric switch 102 runs the distributed spanning tree protocol for the spanning-tree-enabled edge ports of fabric switch 102. This algorithm performs an extra validation for a port transitioning to a root port (i.e., a port being assigned the role of a root port). It should be noted that this validation is for transitioning to a root port and is done if the current port state of the port in consideration is not forwarding. For example, when member switch 116 transitions port 122 to a root port (e.g., changes the spanning tree state machine associated with port 122), or responds to proposal message 132, switch 116 compares the information in the proposal message with the information available locally at switch 116. This information can include available port information associated with one or more port identifiers of fabric switch 102 (e.g., information associated with the port in other member switches). If switch 116 determines that proposal message 132 includes superior information, switch 116 sends an agreement message 142 to switch 106 and transitions port 122 to a root port. However, switch 116 does not set the port state to forwarding. This port state can be referred to as a "root/blocking" state, distinct from a regular root port, which is in a forwarding state by default.

Switch 116 then sends a notification message for switches 112, 114, and 118, comprising information associated with the updated port state. In some embodiments, the notification message is in an internal messaging format for fabric switch 102. Examples of an internal messaging format include, but are not limited to, FC, Ethernet, and TRILL. If port 122 has the most suitable path (e.g., the least-cost path) to root switch 104, switches 112, 114, and 118 send respective response messages to switch 116. A response message can include an approval for port 122 to be the root port, or local superior information if the member switch has a more suitable path to root switch 104 than via port 122. For example, switch 118 can have superior information in proposal message 134 and includes that information in the response message to switch 116. Switch 116 transitions the port state of port 122 to a forwarding state if switch 116 receives approvals from switches 112, 114, and 118. This port state can be referred to as a "root/forwarding" state. Otherwise, switch 116 reselects the port state and/or the port role for port 122, and transitions port 122 to the selected port state and/or the port role.

Similarly, upon receiving proposal message 134, switch 118 determines whether proposal message 134 includes superior information compared to the information available locally at switch 118. If so, switch 118 sends agreement message 144 to switch 108, puts port 124 in a root/blocking state, and sends a notification message to switches 112, 114, and 116. Switches 112, 114, and 116 send respective response messages to switch 118. Switch 118 transitions the port state of port 124 to a root/forwarding state if switch 118 receives approvals from switches 112, 114, and 116. Otherwise, switch 118 reselects the port state and/or the port role for port 124, and transitions port 124 to the selected port state and/or the port role.

Upon receiving agreement messages 142 and 144, respectively, switches 106 and 108 consider ports 126 and 128, respectively, to be designated ports for the spanning tree. Hence, switches 106 and 108 start forwarding frames via ports 126 and 128, respectively, toward fabric switch 102. However, when ports 122 and 124 are in root/blocking state, these frames are discarded at switches 116 and 118, respectively. As a result, the loop is broken in network 100. When one of ports 122 and 124 transitions to a root/forwarding state, that port starts processing received frames. In this way, the distributed spanning tree protocol prevents external loops for a fabric switch while conforming to standard spanning tree protocols. It should be noted that fabric switch 102, as a single switch, is associated with a switch identifier (e.g., a MAC address), which represents fabric switch 102 as a single switch. A respective member switch of fabric switch 102 is associated with that identifier. Switches 116 and 118 use that identifier as the switch identifier in agreement messages 142 and 144, respectively.

Root Priority Vectors

The distributed spanning tree algorithm runs individual spanning tree state machine at a respective member switch of fabric switch 102. At the same time, a respective member switch considers spanning tree information from other member switches in fabric switch 102 for the most suitable information for the entire fabric. To ensure this, a respective member switch in fabric switch 102 maintains a node root priority vector (NRPV), which represents the best spanning tree information that is received via a local port of the member switch. In other words the node root priority vector stores the best locally available information for the spanning tree. For example, the node root priority vector of switch 116 can be a data structure which stores the spanning tree information associated with port 122, which can become the root port for fabric switch 102 if port 122's information is superior compared with other edge ports of fabric switch 102. Switch 116 calculates its own node root priority vector and stores the best locally available information for the spanning tree at switch 116. Switch 116 then generates a notification message comprising the node root priority vector and sends the notification message to all other member switches of fabric switch 102.

Similarly, switch 118 calculates the node root priority vector for port 124, generates a notification message comprising the node root priority vector, and sends the notification message to all other member switches of fabric switch 102. In some embodiments, switches 112 and 114 also calculate their respective node root priority vector for the spanning tree even though these switches do not have an edge port participating in the spanning tree. Whenever a member switch receives better information (e.g., a lower-cost path) via any of the ports of the switch, or the port associated with the current node root priority vector becomes unavailable or starts receiving inferior information, the member switch recalculates the node root priority vector.

Since the member switches of fabric switch 102 exchange their respective node root priority vector with each other, the member switches can use this information to calculate the best spanning tree information received within fabric switch 102. This best information can be referred to as the cluster root priority vector (CRPV). The cluster root priority vector includes the spanning tree information which represents the root port for entire fabric switch 102. For example, switch 116's node root priority vector can represent port 122 and switch 118's node root priority vector can represent port 124. However, if port 122 is the root port for fabric switch 102, the cluster root priority vector represents port 122.

FIG. 1B illustrates an exemplary node root priority vector data structure for facilitating distributed spanning tree port state determination, in accordance with an embodiment of the present invention. In this example, a node root priority vector data structure 150 includes a switch role 152, which indicates the type of role of a member switch. For example, if the switch has a root port, switch role 152 indicates that the switch is a designated switch. The node root priority vector also includes a designated bridge priority vector 154. In some embodiments, designated bridge priority vector 154 is the best of the root priority vectors received via the edge ports of the switch. The root priority vector represents the information included in a BPDU (e.g., a proposal message) received via an edge port. In some embodiments, node root priority vector data structure 150 is maintained per spanning tree instance at a member switch.

Designated bridge priority vector 154 includes root switch identifier 156 (identifier of the root switch of the spanning tree instance), root path cost 158 (the path cost between the member switch and the root switch), designated switch identifier 160 (identifier of the designated switch from which the member switch has received a proposal message), designated port identifier 162 (identifier of the designated port of the designated switch from which the member switch has received a proposal message), and port identifier 164 (the unique port identifier for the fabric switch assigned to the edge port of the member switch via which the proposal message has been received). If the switch role is the root switch, designated bridge priority vector 154 is not applicable. In some embodiments, node root priority vector data structure 150 can further include other information, such as a hello timer, a forward delay timer, a maximum age of a vector, and a message age.

FIG. 1C illustrates an exemplary node root priority table for facilitating distributed spanning tree port state determination, in accordance with an embodiment of the present invention. In this example, a node root priority table 170 includes node root priority vector information for fabric switch 102, as described in conjunction with FIG. 1A. Suppose that switch 116 is the designated switch for fabric switch 102, and entries 172 and 176 correspond to node root priority vectors of switches 116 and 118, respectively. Entry 172 includes a switch identifier 182 and node root priority vector 174 of switch 116. Similarly, entry 176 includes a switch identifier 184 and node root priority vector 178 of switch 118.

Node root priority vector 174 indicates the switch role to be designated, and includes the switch identifier of root switch 104; the root path cost to switch 116 (the path cost between root switch 104 and switch 116); the switch identifier of designated switch 106, which sends proposal message 132 to switch 116; the port identifier of designated port 126, via which proposal message 132 is sent; and port identifier 192 of port 122, via which proposal message 132 is received. Port identifier 192 is the unique port identifier for fabric switch 102 assigned to port 122. Similarly, node root priority vector 178 indicates switch role to be blocked, and includes the switch identifier of root switch 104; the root path cost to switch 118; the switch identifier of designated switch 108 which sends proposal message 134 to switch 118; the port identifier of designated port 128, via which proposal message 134 is sent; and port identifier 194 of port 124, via which proposal message 134 is received. Port identifier 194 is the unique port identifier for fabric switch 102 assigned to port 124.

Even through FIG. 1C illustrates entries for switches 116 and 118, node root priority table 170 can also include entries for switches 112 and 114. A respective member switch in fabric switch 102 maintains a node root priority table. The member switch can use the information in the node root priority table to calculate the cluster root priority vector for fabric switch 102. In the example in FIG. 1C, node root priority vector 174 in entry 172 is the cluster root priority vector for fabric switch 102.

Port State Determination

Figure 2A:
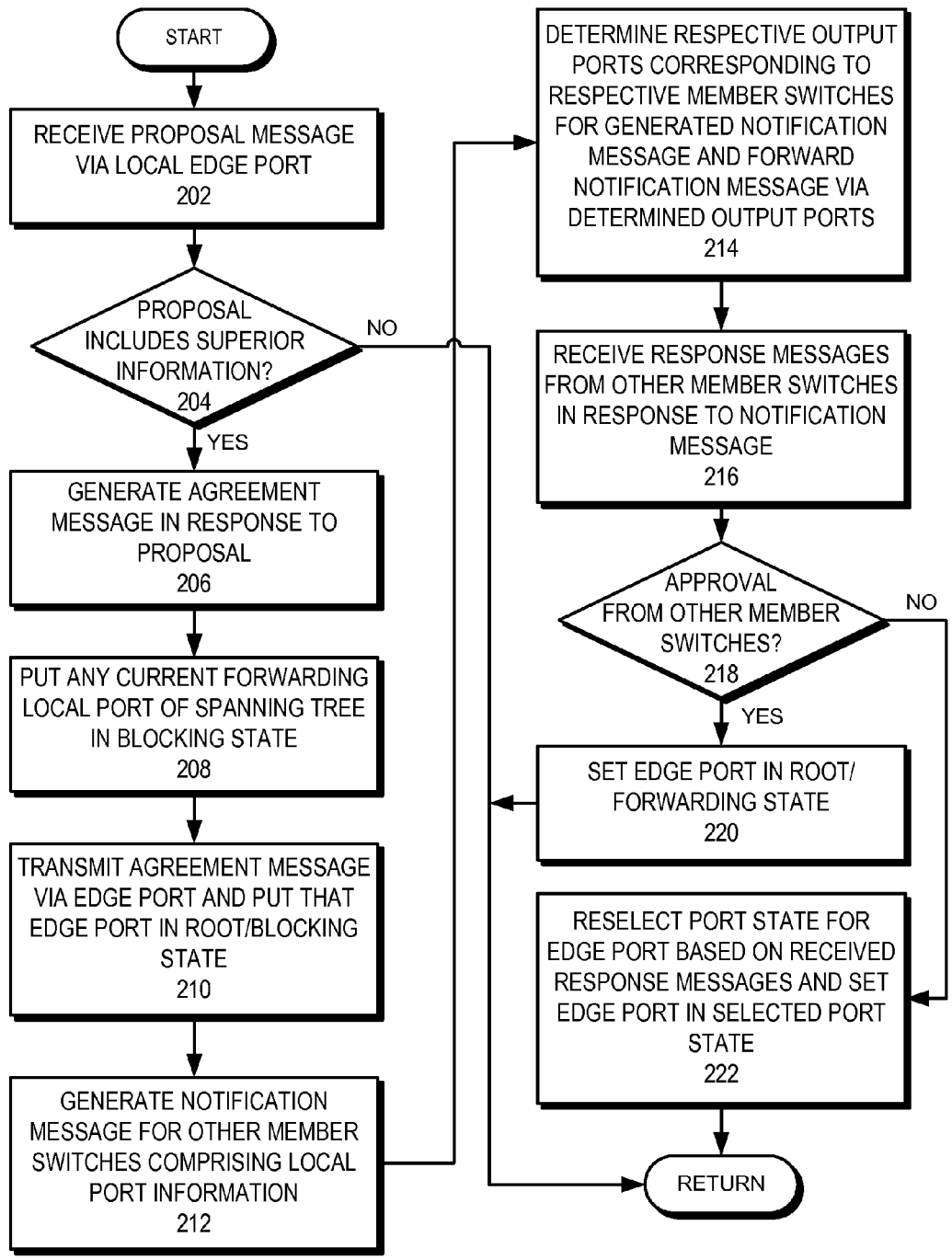
FIG. 2A presents a flowchart illustrating the process of a member switch of a fabric switch determining the spanning tree port state of a local edge port, in accordance with an embodiment of the present invention.

FIG. 2A presents a flowchart illustrating the process of a member switch of a fabric switch determining the spanning tree port state of a local edge port, in accordance with an embodiment of the present invention. During operation, the switch receives a proposal via a local edge port (operation 202). The switch checks whether the proposal includes superior information (operation 204). If not, the switch can discard the proposal message. If the proposal includes superior information, the switch generates an agreement message in response to the proposal message (operation 206). The switch puts any current forwarding local port of the spanning tree (e.g., the local port which is in a forwarding state and participating in the spanning tree) in a blocking state (operation 208). The switch transmits the agreement message via the edge port and puts that edge port in a root/blocking state (operation 210), as described in conjunction with FIG. 1A.

The switch then generates a notification message for other member switches of the fabric switch comprising the local port information (operation 212). In some embodiments, this local port information is represented by a node root priority vector, as described in conjunction with FIG. 1B. The switch determines respective output ports corresponding to respective member switches for the generated notification message and forwards the notification message via the determined output ports (operation 214). The switch receives response messages from other member switches in response to the notification message (operation 216). This response message can include an approval or superior information from a remote edge port (an edge port in a different member switch) of the fabric switch.

The switch checks whether the switch has received approval from the other member switches (operation 218). If the switch has received approval from all other member switches, the local edge port has the superior information for the entire fabric switch for the spanning tree. The switch then sets the edge port in a root/forwarding state (operation 220). If the switch has not received approval from all other member switches, a remote edge port has the superior information for the entire fabric switch for the spanning tree. The switch then reselects the port state for the edge port based on the received response messages and sets the edge port in the selected port state (operation 222). In some embodiments, the response message is based on the internal messaging of the fabric switch and is not a control message of the spanning tree.

Figure 2B:
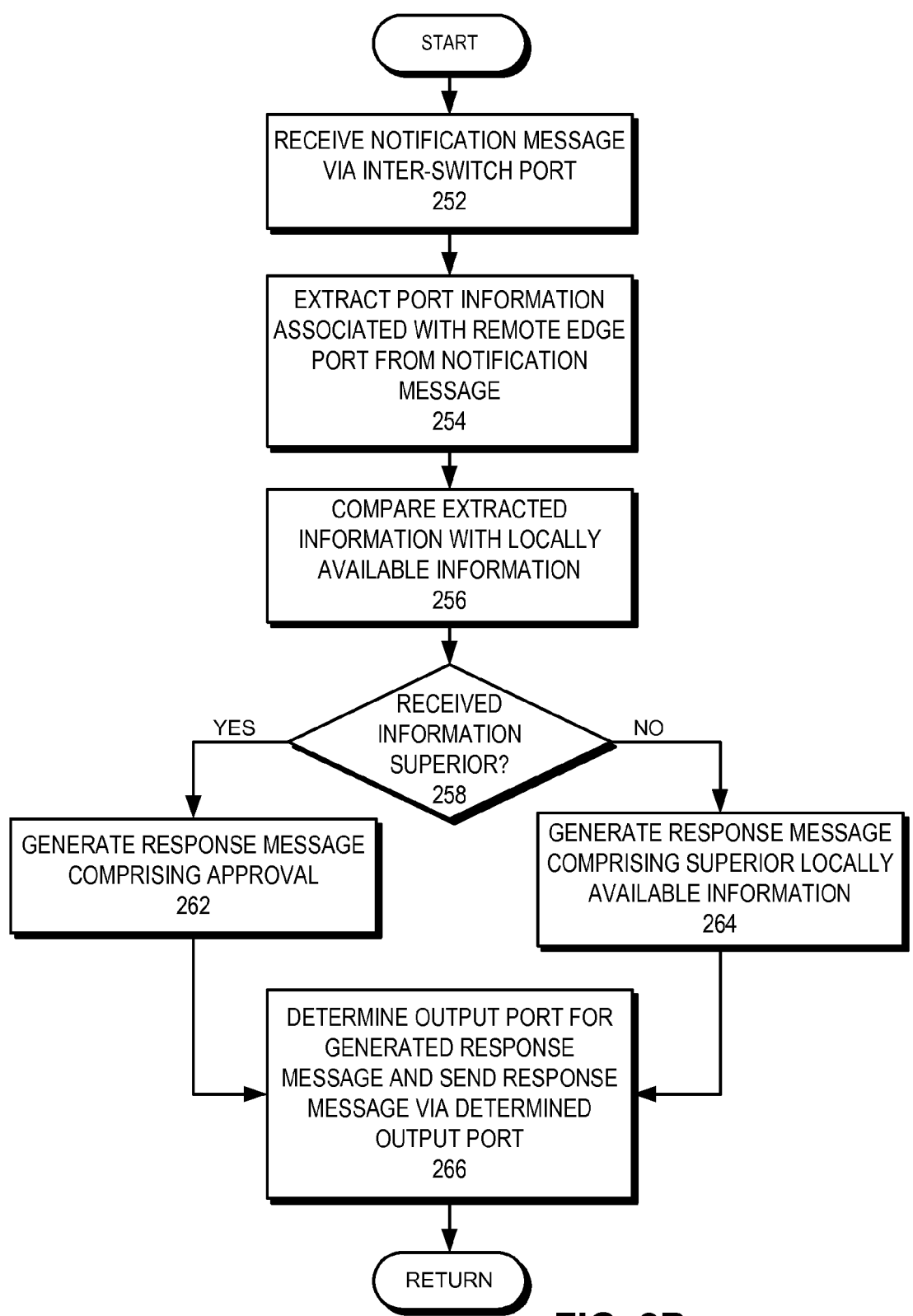
FIG. 2B presents a flowchart illustrating the process of a member switch of a fabric switch generating a response message for determining the spanning tree port state of a remote edge port, in accordance with an embodiment of the present invention.

FIG. 2B presents a flowchart illustrating the process of a member switch of a fabric switch generating a response message for determining the spanning tree port state of a remote edge port, in accordance with an embodiment of the present invention. During operation, the switch receives a notification message via an inter-switch port (operation 252). The switch extracts port information associated with a remote edge port from the notification message (operation 254) and compares the extracted information with locally available information (operation 256). In some embodiments, the switch obtains the locally available information from a local node root priority table, as described in conjunction with FIG. 1C. The switch checks whether the received information is superior (operation 258). If so, the switch generates a response message comprising an approval (operation 262). Otherwise, the switch generates a response message comprising superior locally available information (operation 264). The switch then determines an output port for the generated response message and sends the response message via the determined output port (operation 266).

Retentive Port Identifier

Each port of a switch participating in a spanning tree should be assigned a unique identifier. With existing technologies, this port identifier in a typical switch is the physical port number. However, in a fabric switch, the same physical port number can be associated with edge ports of different member switches and cause a conflict. A fabric-switch-wide unique port identifier resolves this conflict and uniquely identifies a respective edge port of a fabric switch in a spanning tree. In the example in FIG. 1A, if port 122 of switch 116 in fabric switch 102 is a designated port of a spanning tree, other switches in network 100 can uniquely identify port 122 using its port identifier 192, as described in conjunction with FIG. 1C. This allows fabric switch 102 to participate in a spanning tree as a single switch.

However, for spanning tree protocols, such as RSTP and MSTP, a port identifier can be 16 bits long with two parts. The first part is 4 bits long and indicates a port priority. The second part is 12 bits long and indicates a port number. For STP, the second part is 8 bits long. As a result, the maximum number of port numbers associated with a switch becomes restricted. However, because a fabric switch comprises a plurality of physical switches, the number of ports of a fabric switch can be significantly large and 8 bits may not be enough to represent each of these ports. Furthermore, if a member switch leaves and reenters a fabric switch, the edge ports of that member switch can receive new port identifiers. As a result, even though the topology has not been changed, the spanning tree may re-converge, causing inefficiency in the network. Embodiments of the present invention solve this problem by allowing an edge port to retain its fabric-switch-wide unique port identifier, using identifiers only for spanning-tree-enabled edge ports, and reusing stale identifiers for new edge ports.

Figure 3A:
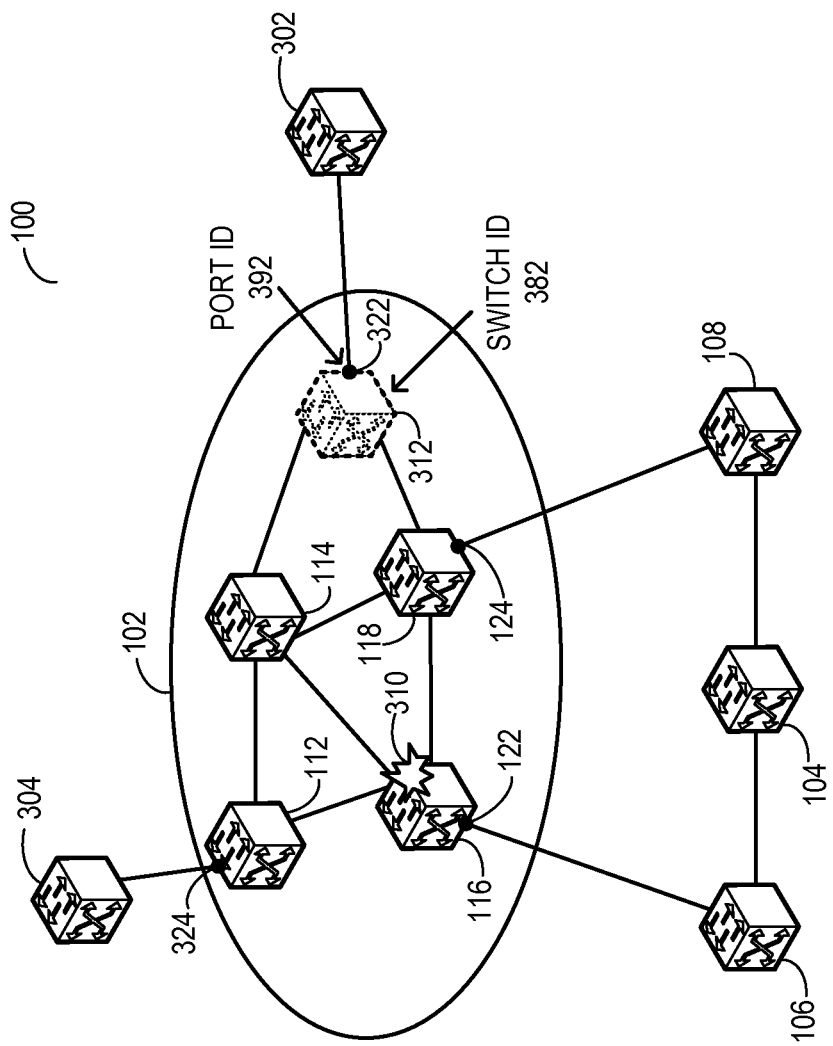
FIG. 3A illustrates an exemplary retentive port identifier assignment of an edge port of a fabric switch, in accordance with an embodiment of the present invention.

FIG. 3A illustrates an exemplary retentive port identifier assignment of an edge port of a fabric switch, in accordance with an embodiment of the present invention. In this example, unique port identifiers 192 and 194 are assigned to ports 122 and 124, respectively, as described in conjunction with FIG. 1C. Port identifiers 192 and 194 are assigned when spanning tree is enabled for ports 122 and 124, respectively. In some embodiments, port identifiers for fabric switch 102 are assigned by a computer system, such as an administrator device (not shown) or a designated member switch, and stored in a port number allocation table. Port identifiers 192 and 194 remain tied to ports 122 and 124, respectively, until fabric switch 102 runs out of available port identifiers for fabric switch 102. In some embodiments, the number of available port identifiers for fabric switch 102 is determined based on the spanning tree protocol fabric switch 102 is participating in.

Suppose that a status update event 310 occurs for member switch 116. A status update event can change the status of a port's entry in the port number allocation table. Status update event 310 can be a learned event, which a member switch of a fabric switch learns, or a configured event, which is configured for a member switch. Examples of a learned state update event include, but are not limited to, a switch failure, a line card failure, and a link failure. Examples of a configured event include, but are not limited to, spanning tree disablement for an edge port and switching off a member switch. In the example in FIG. 3A, if port 122 becomes unavailable due to a status update event (e.g., switch 116 fails or becomes disconnected in fabric switch 102), port 122 no longer participates in the spanning tree. However, port 122's port identifier 192 is not reused for other edge ports of fabric switch 102. Instead, port 122's entry in the port number allocation table of fabric switch 102 is marked as "stale."

During operation, a new member switch 312 joins fabric switch 102 as a member switch (denoted with dotted lines). Switch identifier 382 is then assigned to switch 312. This assignment can be automatic, without any manual configuration, or based on the configuration of a user (e.g., a network administrator). Any edge port of switch 312 is assigned a new port identifier instead of stale port identifier 192. In some further embodiments, newly joined member switch 312 receives the most recent port identifier allocation table from other member switches of fabric switch 102, allocates the port identifier to local edge port 322, updates the local port identifier allocation table accordingly, and synchronizes the updated port identifier allocation table with other member switches.

It should be noted that multiple member switches can concurrently try to allocate port identifiers to local edge ports. Suppose that when switch 312 is joining fabric switch 102, spanning tree is enabled for edge port 324 of switch 112. This edge port can couple switch 304 with switch 112. As a result, switches 312 and 112 can concurrently try to assign a port identifier to ports 322 and 324, respectively. This can lead to a race condition. This problem is solved by associating a fabric-wide lock with a respective port identifier assignment. For example, when switch 312 is allocating a port identifier for port 322, switch 312 obtains the lock and notifies all other member switches. As a result, other member switches refrain from allocating an identifier to any local edge port. Switch 312 allocates a port identifier to local edge port 322, updates the local port number allocation table accordingly, synchronizes the updated port number allocation table with other member switches, and releases the lock. Switch 112 then obtains the lock, allocates the next available port identifier to local edge port 324, updates the local port number allocation table accordingly, synchronizes the updated port number allocation table with other member switches, and releases the lock.

In the example in FIG. 3A, edge port 322 of member switch 312 is coupled to switch 302 and participates in the spanning tree. A new fabric-switch-wide unique port identifier 392 is assigned to port 322. However, when spanning tree is enabled for port 322 and no new unique port number is available, stale port identifier 192 can be assigned to port 322. Otherwise, port identifier 192 remains persistently tied to port 122. When the effect of status update event 310 ends (e.g., switch 116 recovers from failure or becomes reconnected in fabric switch 102), the same port identifier 192 is assigned to port 122. This prevents topology changes due to changes of the port identifier of a port. In some embodiments, the port identifier allocation table is synchronized with a respective member switch of fabric switch 102 to ensure that the port identifier allocation information is not lost if one or more member switches leave fabric switch 102.

FIG. 3B illustrates an exemplary port identifier allocation table for retentive port identifier assignment in a fabric switch, in accordance with an embodiment of the present invention. In this example, port identifier allocation table 350 represents port identifier allocation to the edge ports of fabric switch 102 following status update event 310 and enabling of the spanning tree for port 322. A respective entry of table 350 includes a port identifier 352, an interface name 354, and a status 356 for the entry. Entry 362 of table 350 includes port identifier 192, which is allocated to port 122; an interface name of port 122; and a status indicating that entry 362 is stale. In some embodiments, interface name of a port is based on the switch identifier of the member switch, which includes the port; a line card number of the line card, which includes the port; and a physical port number. Suppose that the line card number for port 122 is 372 and the physical port number of port 122 in switch 116 is 382. Then the interface name for port 122 can be 182/372/382. In some embodiments, if a switch has only one line card (e.g., in a "pizza-box" switch type), the line card number can be zero ("0").

Similarly, entry 364 includes port identifier 194, which is allocated to port 124; an interface name of port 124; and a status indicating that entry 364 is active (or used). If a status is active, the corresponding port identifier is not assigned to any other edge port of fabric switch 102. Suppose that the line card number for port 124 is 374 and the physical port number of port 124 in switch 118 is 384. Then the interface name for port 124 can be 184/374/384. Entry 366 includes port identifier 392, which is allocated to port 322; an interface name of port 322; and a status indicating that entry 366 is active. Suppose that the line card number for port 322 is 376 and the physical port number of port 322 in switch 312 is 386. Then the interface name for port 322 can be 184/376/386.

If spanning tree is enabled for another edge port of fabric switch 102, port identifier allocation table 350 ensures that already assigned identifiers are not reassigned to that edge port. If the maximum number of assignable port identifiers for fabric switch 102 is reached and no stale entry is available in table 350, spanning tree may not be enabled for that edge port. In this way, table 350 facilitates allocation of a unique port identifier to a respective spanning-tree-enabled edge port of fabric switch 102. By combining the switch identifier, line card number, and physical port number of a port for the interface name, a respective port of a fabric switch is uniquely identified by the interface name. Table 350 maps that interface name to the port identifier, thereby tying the port identifier to the physical port. It should be noted that an interface name by itself may not be suitable for a spanning tree because the interface name may not be compatible with a spanning tree protocol. Table 350 further facilitates persistent port number allocation for the port identifiers.

Retentive Port Identifier Processing

Figure 4A:
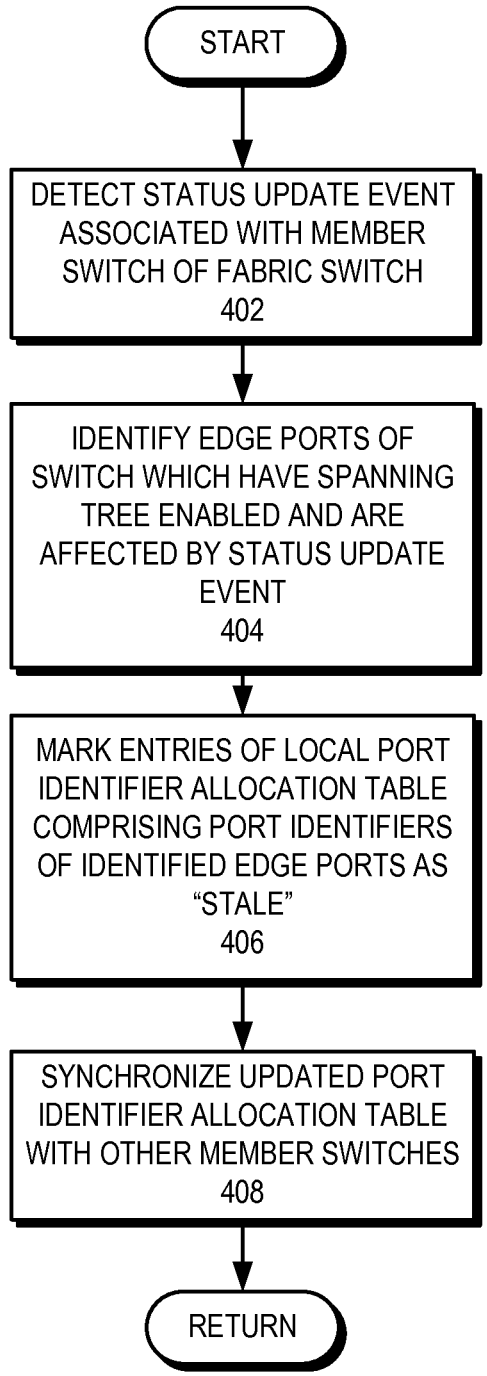
FIG. 4A presents a flowchart illustrating the process of a member switch of a fabric switch updating the status of port identifiers in a port identifier allocation table, in accordance with an embodiment of the present invention.

FIG. 4A presents a flowchart illustrating the process of a member switch of a fabric switch updating the status of port identifiers in a port identifier allocation table, in accordance with an embodiment of the present invention. During operation, the switch detects a status update event associated with a member switch, which can be the local switch or a remote switch, of the fabric switch (operation 402). The switch identifies the edge ports of the switch which have spanning tree enabled and are affected by the status update event (operation 404). The switch then marks the entries of the local port identifier allocation table comprising the port identifiers of the identified edge ports as "stale" (operation 406), as described in conjunction with FIG. 3B. The switch synchronizes the updated port identifier allocation table with other member switches (operation 408). This synchronization process can comprise an exchange of the most recent port identifier allocation table among member switches.

Figure 4B:
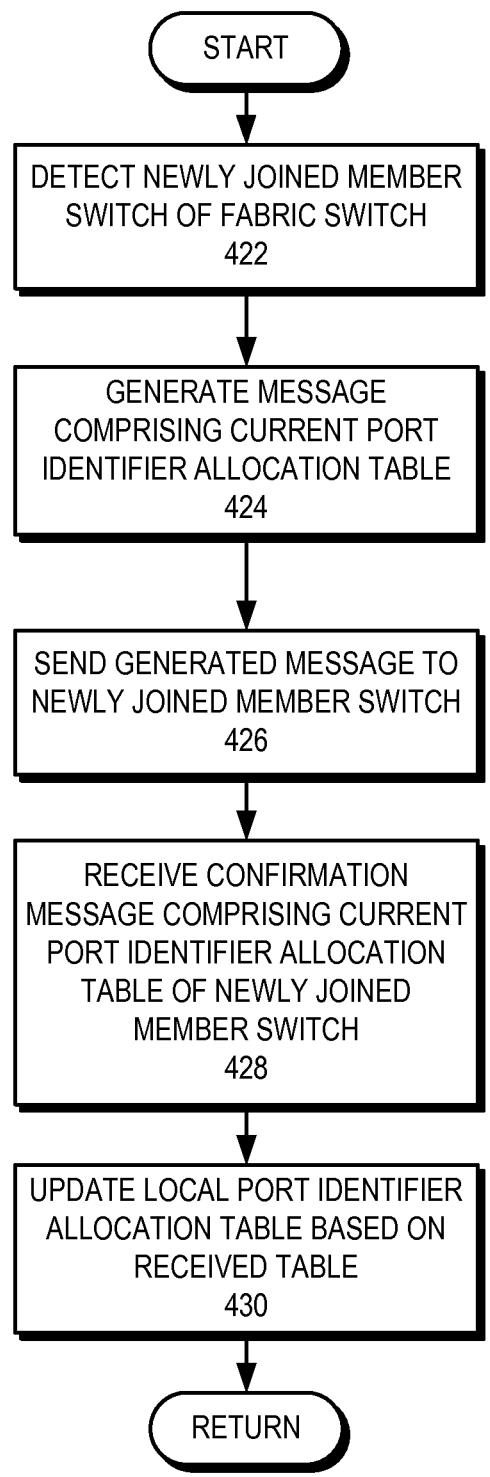
FIG. 4B presents a flowchart illustrating the process of a member switch of a fabric switch synchronizing port identifier allocation information with a newly joined member switch, in accordance with an embodiment of the present invention.

FIG. 4B presents a flowchart illustrating the process of a member switch of a fabric switch synchronizing port identifier allocation information with a newly joined member switch, in accordance with an embodiment of the present invention. During operation, the switch detects a newly joined member switch of the fabric switch (operation 422). This newly joined member switch can be a new switch joining the fabric switch or a returning member switch, which has left the fabric switch. The switch then generates a message comprising the current (e.g., the most recent) port identifier allocation table (operation 424) and sends the generated message to the newly joined member switch (operation 426). The switch receives a confirmation message comprising the current port identifier allocation table of the newly joined member switch (operation 428) and updates the local port identifier allocation table based on the received table (operation 430).

Figure 4C:
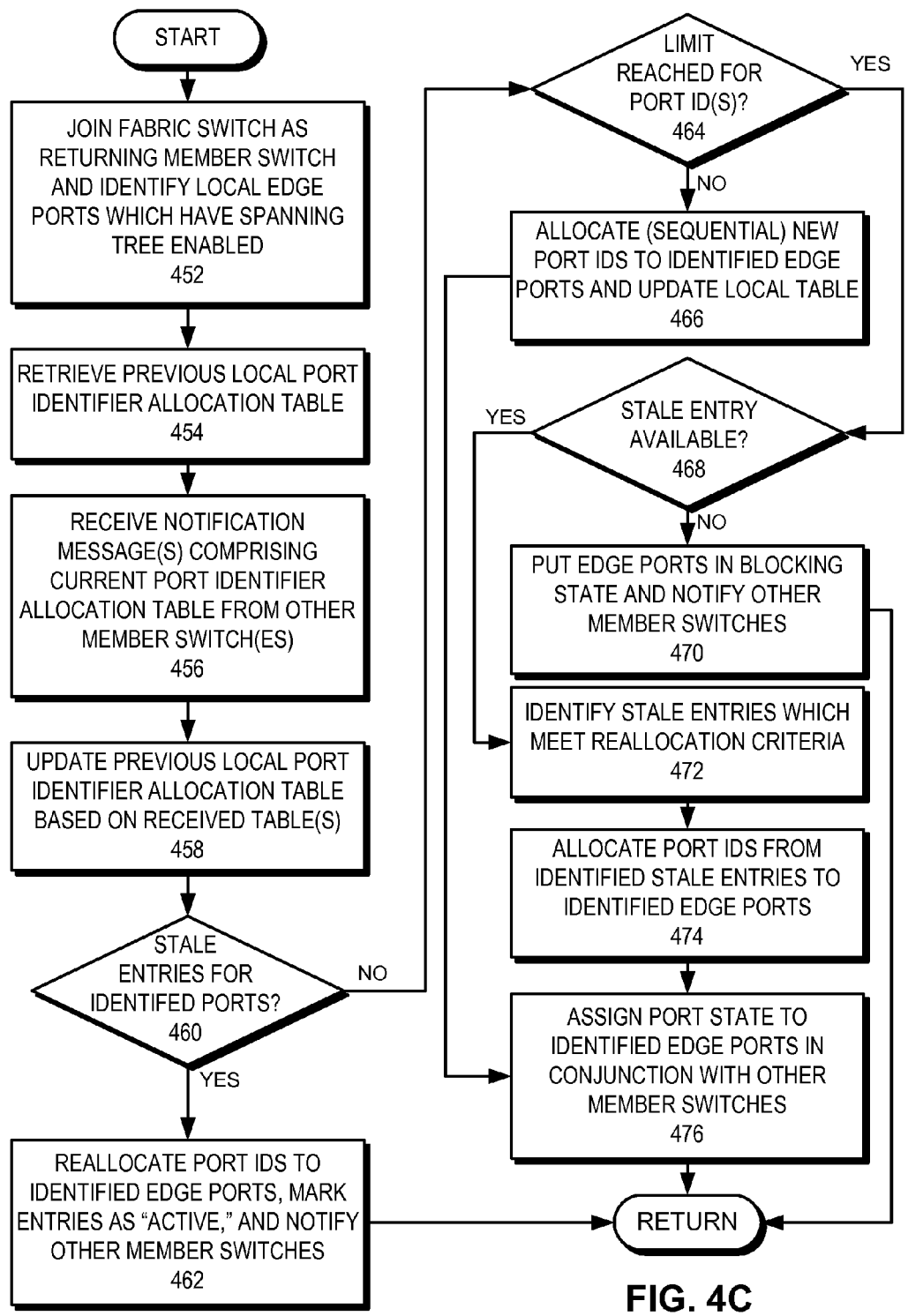
FIG. 4C presents a flowchart illustrating the process of a returning member switch of a fabric switch allocating a port identifier and assigning port state to local edge ports, in accordance with an embodiment of the present invention.

FIG. 4C presents a flowchart illustrating the process of a returning member switch of a fabric switch allocating a port identifier and assigning port state to local edge ports, in accordance with an embodiment of the present invention. During operation, the switch joins the fabric switch as a returning member switch and identifies local edge ports which have the spanning tree enabled (operation 452). A returning member switch is a switch for which a status update event has been completed, such as a switch recovered from a failure. The switch then retrieves the previous local port identifier allocation table (operation 454). This table can be retrieved with other previous local configurations of the switch prior to the status update event. The switch receives notification message(s) comprising the current port identifier allocation table from one or more other member switch(es) (operation 456) and updates the previous local port identifier allocation table based on the received table(s) (operation 458).

The switch checks whether the updated port identifier allocation table has stale entries for the identified ports (operation 460), as described in conjunction with FIG. 3A. If the table has stale entries for the identified ports, the switch reallocates the port identifiers of the corresponding stale entries to the identified edge ports, marks the stale entries as "active," and notifies other member switches of the updated port identifier allocation table (operation 462). This notification process includes generating a message, identifying output ports for the message, and sending the message via the output port.

If the table does not have stale entries for the identified ports, the previously assigned port identifiers have been assigned to other edge ports of the fabric switch. The switch then checks whether the limit has been reached for port identifiers (operation 464). In some embodiments, this limit is determined based on the number of identifiers a spanning tree protocol allows for a switch. If the limit has not been reached, the switch allocates new port identifiers to the identified edge ports and updates the local port identifier allocation table accordingly (operation 466). In some embodiments, the new port identifiers are generated sequentially. If the limit has been reached, the switch checks whether any stale entry is available in the local port identifier allocation table (operation 468). If no stale entry is available, spanning tree cannot be enabled for that edge port. The switch then puts that edge port in a blocking state and notifies other member switches accordingly (operation 470).

If a stale entry is available, the switch identifies the stale entries which meet reallocation criteria (operation 472). In some embodiments, reallocation criteria include an age of a stale entry (e.g., the oldest entry is selected first for reassignment), and an indication whether an entry is stale due to a configured event or a learned event (e.g., a configured entry is selected first for reassignment). Checking reallocation criteria for entries in a port identifier allocation table is discussed in further detail in conjunction with FIG. 5. The switch then allocates the port identifiers from the identified stale entries to the identified edge ports (operation 474) and assigns the port states to identified ports in conjunction with other member switches (operation 476), as described in conjunction with FIG. 2B.

Figure 4D:
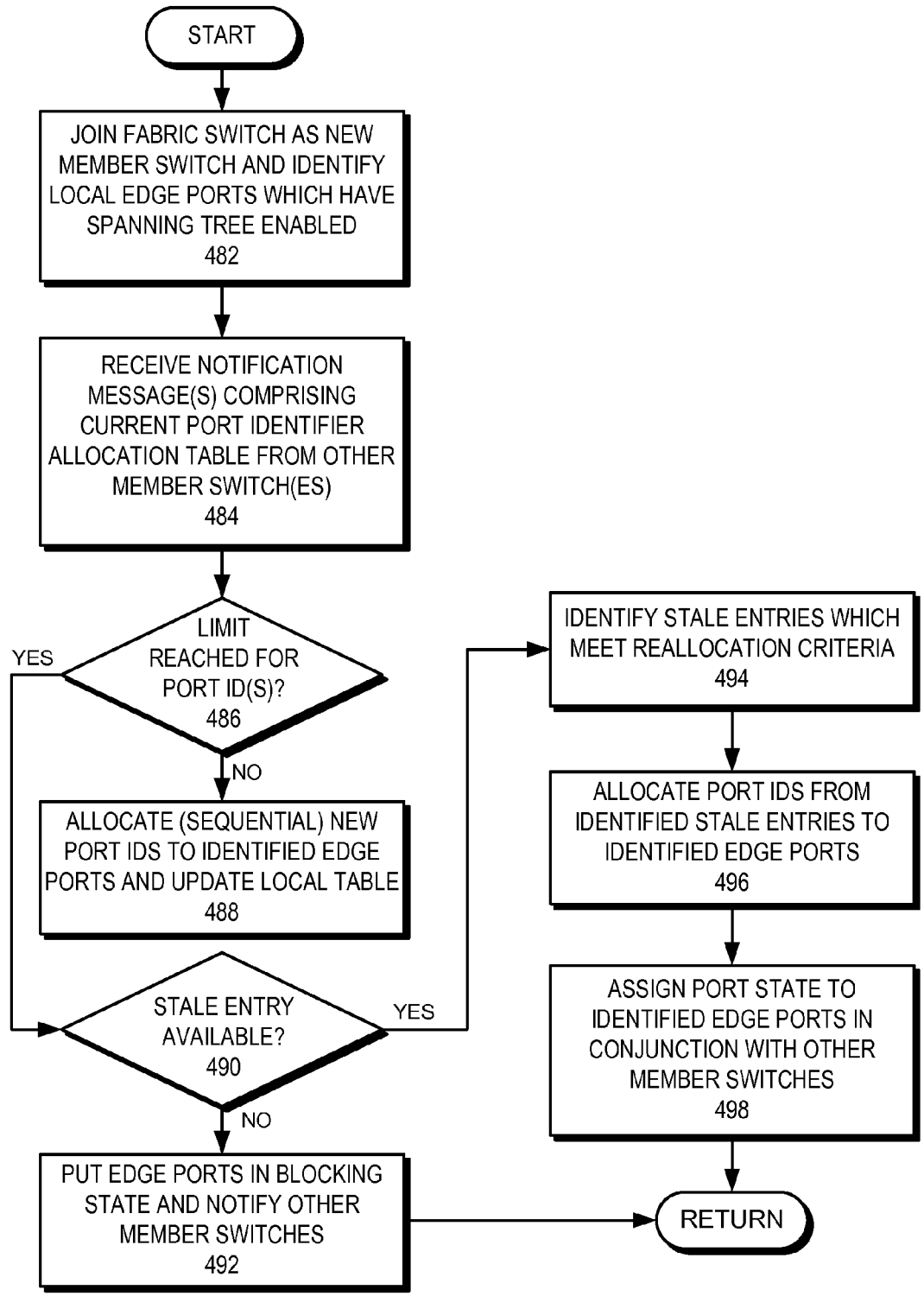
FIG. 4D presents a flowchart illustrating the process of a newly joined member switch of a fabric switch allocating a port identifier and assigning port state to local edge ports, in accordance with an embodiment of the present invention.

FIG. 4D presents a flowchart illustrating the process of a newly joined member switch of a fabric switch allocating a port identifier and assigning port state to local edge ports, in accordance with an embodiment of the present invention. During operation, the switch joins the fabric switch as a new member switch and identifies local edge ports which have spanning tree enabled (operation 482). The switch receives notification message(s) comprising the current port identifier allocation table from one or more other member switch(es) (operation 484). The switch then checks whether the limit has been reached for port identifiers (operation 486). If the limit has not been reached, the switch allocates new port identifiers to the identified edge ports and updates the local port identifier allocation table accordingly (operation 488).

If the limit has been reached, the switch checks whether any stale entry is available in the local port identifier allocation table (operation 490). If no stale entry is available, spanning tree cannot be enabled for that edge port. The switch then puts that edge port in a blocking state and notifies other member switches accordingly (operation 492). If a stale entry is available, the switch identifies the stale entries which meet reallocation criteria (operation 494). Checking reallocation criteria for entries in a port identifier allocation table is discussed in further detail in conjunction with FIG. 5. The switch then allocates the port identifiers from the identified stale entries to the identified edge ports (operation 496) and assigns the port states to identified ports in conjunction with other member switches (operation 498), as described in conjunction with FIG. 2B.

Figure 5:
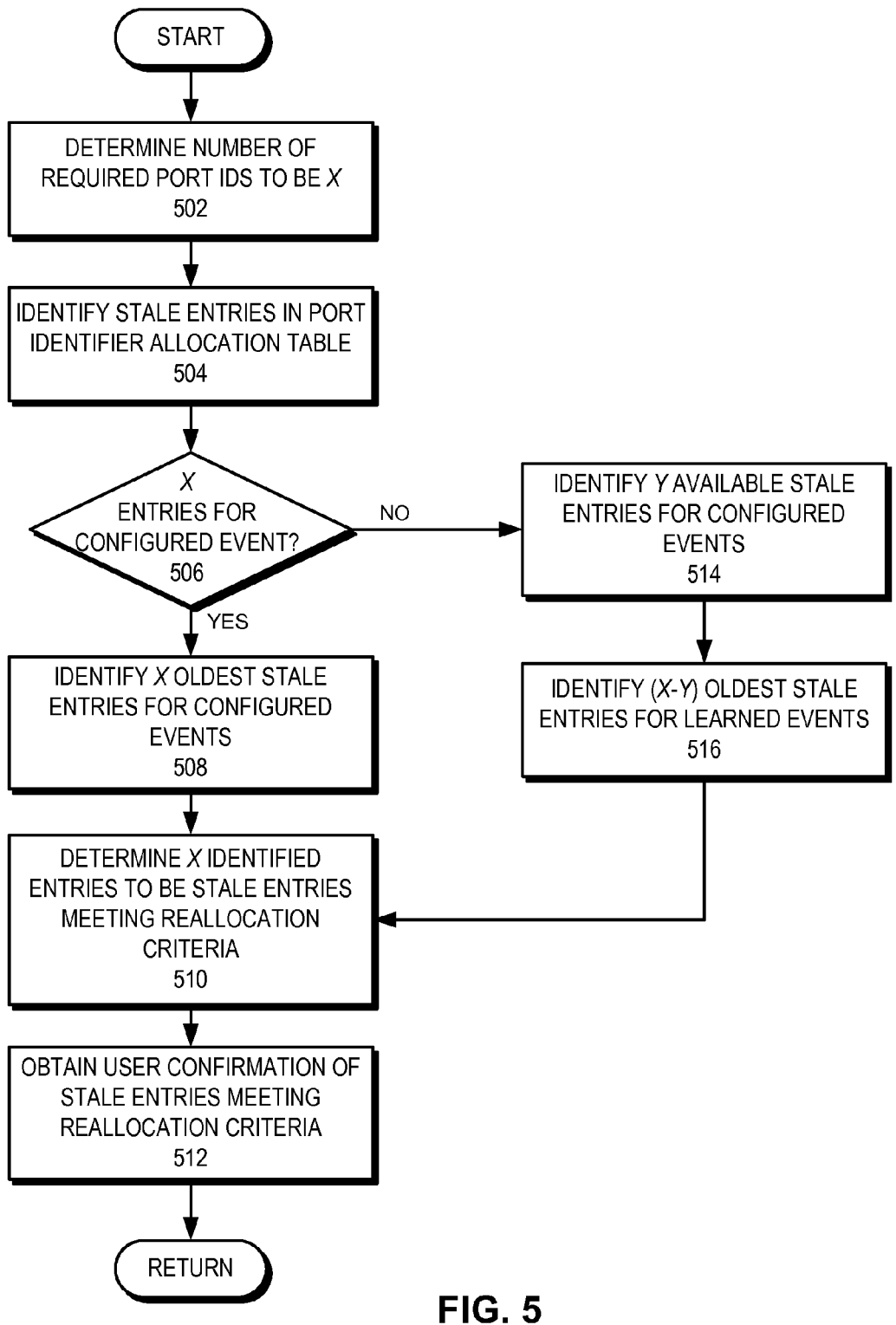
FIG. 5 presents a flowchart illustrating the process of a member switch of a fabric switch checking reallocation criteria for entries in a port identifier allocation table, in accordance with an embodiment of the present invention.

FIG. 5 presents a flowchart illustrating the process of a member switch of a fabric switch checking reallocation criteria for entries in a port identifier allocation table, in accordance with an embodiment of the present invention. During operation, the switch determines the number of required port identifiers to be X (operation 502) and identifies the stale entries in the local port identifier allocation table (operation 504). The switch then checks whether the port identifier allocation table has at least X stale entries for configured events (operation 506). If the port identifier allocation table has at least X stale entries for configured events, the switch identifies the X oldest stale entries for configured events (operation 508).

If the port identifier allocation table does not have at least X stale entries for configured events, the switch identifies Y available stale entries for configured events (operation 514) and identifies (X-Y) oldest stale entries for learned events (operation 516). After identifying the stale entries (operation 508 or 516), the switch determines the X identified entries to be stale entries meeting the reallocation criteria (operation 510). In some embodiments, the switch can obtain user confirmation of stale entries meeting reallocation criteria (operation 512). For example, the switch can provide a warning message to the user indicating that the port identifiers which are about to be reallocated. These port identifiers are reallocated when the user confirms the selection of the port identifiers for reallocation. If the user does not confirm the selection, the identifiers of the identified stale entries are not reassigned.

Unique Identifier for Fabric Switches

An identifier is associated with a fabric switch and identifies the fabric switch as a single switch. This identifier is associated with a respective member switch of the fabric switch. However, because a fabric switch comprises a plurality of member switches, and a member switch can be swapped from one fabric switch to another fabric switch, the identifier of the fabric switch should not be associated with any specific physical switch and should be tied to the fabric switch. Furthermore, if two neighboring fabric switches participating in a spanning tree have the same identifier, switches in the spanning tree can consider both switches as the same switch.

Figures 6A, 6B:
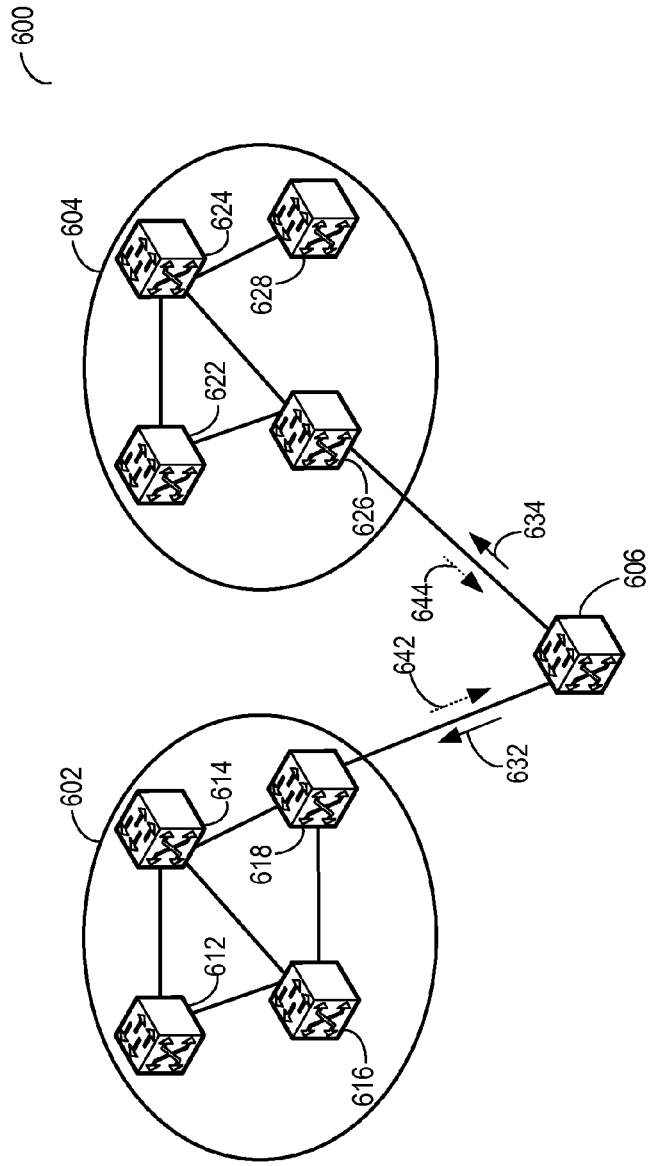
FIG. 6A illustrates an exemplary retentive and unique identifier assignment to fabric switches, in accordance with an embodiment of the present invention.
FIG. 6B illustrates exemplary unique identifiers for fabric switches, in accordance with an embodiment of the present invention.

FIG. 6A illustrates an exemplary retentive and unique identifier assignment to fabric switches, in accordance with an embodiment of the present invention. As illustrated in FIG. 6A, a layer-2 network 600 (e.g. Ethernet) includes fabric switches 602 and 604, and switch 606. Fabric switch 602 includes member switches 612, 614, 616, and 618, and fabric switch 604 includes member switches 622, 624, 626, and 628. In some embodiments, one or more switches, including one or more member switches of fabric switches 602 and 604, in network 600 can be virtual switches (e.g., a software switch running on a computing device).

In some embodiments, fabric switches 602 and 604 are respective TRILL networks and respective member switches of fabric switches 602 and 604, such as switches 618 and 626, are TRILL RBridges. Switches in fabric switches 602 and 604 use edge ports to communicate with end devices (e.g., non-member switches) and inter-switch ports to communicate with other member switches. Data communication via an edge port can be based on Ethernet and via an inter-switch port can be based on TRILL protocol. It should be noted that control message exchange via inter-switch ports can be based on a different protocol (e.g., IP or FC protocol).

In network 600, member switches 618 and 626 of fabric switches 602 and 604, respectively, are coupled to switch 606. Switches 602, 604, and 606 participate in a spanning tree as a single switch. Fabric switches 602 and 604 operate as respective single switches and appear as a single switch to switch 606. Hence, fabric switches 602 and 604 participate in the spanning tree protocol as a single switch. During operation, switch 606 sends proposal messages 632 and 634 to switches 618 and 626, respectively. Switches 618 and 626 consider the received information to be superior to any locally available information of the spanning tree, and respond by sending agreement messages 642 and 644, respectively.

It should be noted that fabric switch 602, as a single switch, is associated with an identifier (e.g., a MAC address). This identifier is used in agreement message 642 as the switch identifier. As a result, upon receiving agreement message 642, switch 606 considers fabric switch 602 as a single switch. Similarly, fabric switch 604, as a single switch, is associated with an identifier. This identifier is used in agreement message 644 as the switch identifier. As a result, upon receiving agreement message 644, switch 606 considers fabric switch 604 as a single switch. Because different fabric switches are often configured separately, fabric switches 602 and 604 can be configured with the same fabric switch identifier. If this same fabric switch identifier is used to derive the switch identifier (e.g., a MAC address) of fabric switches 602 and 604, these two fabric switches can have the same switch identifier.

In the example of FIG. 6A, if both fabric switches 602 and 604 have the same switch identifier, switch 606 considers agreement messages 642 and 644 to be from the same switch. In response, switch 606 perceives a loop, and blocks one of the corresponding ports. As a result, one of fabric switches 602 and 604 can become disconnected. Embodiments of the present invention solve this problem by combining an organizationally unique identifier (OUI), a fabric switch identifier, and a random number or a configured number to generate a switch identifier for a fabric switch. When switches 602 and 604 are configured with the same fabric switch identifier, the random number can generate two distinct switch identifiers. Even when the random numbers of fabric switches 602 and 604 are same, a user can configure a portion of the switch identifiers to make them distinct.

FIG. 6B illustrates exemplary unique identifiers for fabric switches, in accordance with an embodiment of the present invention. In this example, switch identifier 650-A is generated based on an organizationally unique identifier 652, fabric switch identifier 654, and random number 656. Organizationally unique identifier 652 is a number that uniquely identifies a vendor, manufacturer, or other organization and is used as the first portion of derivative identifiers to uniquely identify a particular piece of equipment. For example, organizationally unique identifier 652 can be the prefix of a MAC address. Fabric switch identifier 654 is an identifier assigned to a fabric switch, and is associated with a respective member switch of the fabric switch. If switch identifier 650-A is the same as a switch identifier of another fabric switch, a configured number 658 can be used to generate switch identifier 650-B instead of random number 656. In some embodiments, random number 656 and configured number 658 are one byte long, and fabric switch identifier 654 is two bytes long.

Figure 7A:
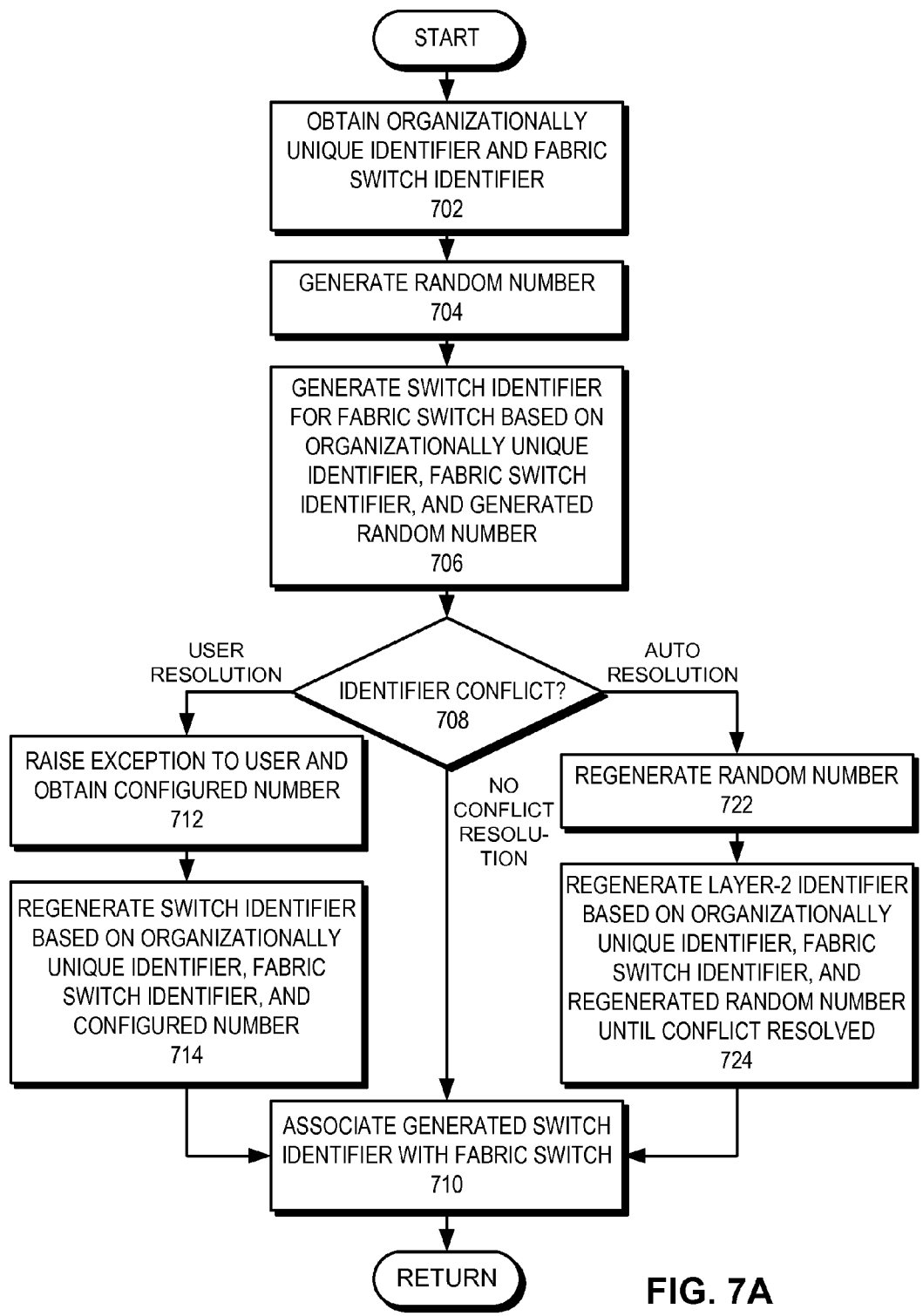
FIG. 7A presents a flowchart illustrating the process of a member switch of a fabric switch associating a unique identifier with the fabric switch, in accordance with an embodiment of the present invention.

FIG. 7A presents a flowchart illustrating the process of a member switch of a fabric switch associating a unique identifier with the fabric switch, in accordance with an embodiment of the present invention. During operation, the switch obtains an organizationally unique identifier and a fabric switch identifier of the fabric switch (operation 702) and generates a random number (operation 704). The switch then generates a switch identifier for the fabric switch based on the organizationally unique identifier, fabric switch identifier, and generated random number (operation 706). The switch checks how an identifier conflict should be resolved (operation 708). If the generated switch identifier does not require a conflict resolution, the switch associates the generated switch identifier with the fabric switch (operation 710). In some embodiments, associating the switch identifier with the fabric switch comprises associating the switch identifier with the local switch and notifying other member switches.

If the conflict should use user resolution (should be resolved by a user), the switch raises an exception to the user (e.g., an error message) and obtains a configured number from the user (operation 712). The switch then regenerates another switch identifier for the fabric switch based on the organizationally unique identifier, fabric switch identifier, and obtained configured number (operation 714). If the conflict should use automatic resolution (should be automatically resolved by the switch), the switch regenerates the random number (operation 722). The switch then continues to regenerate another switch identifier for the fabric switch based on the organizationally unique identifier, fabric switch identifier, and regenerated random number until the conflict is resolved (operation 724).

Figure 7B:
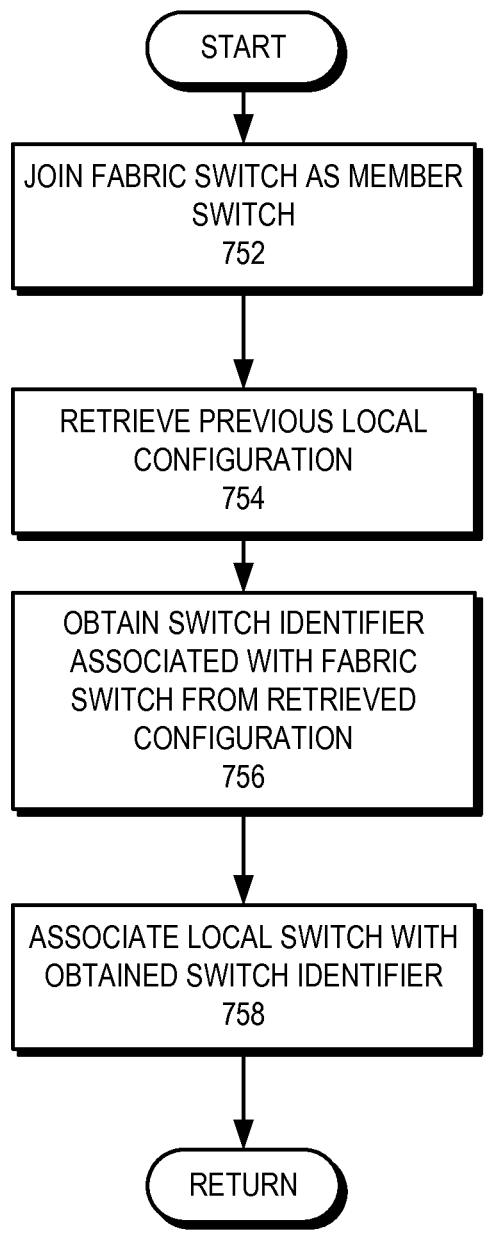
FIG. 7B presents a flowchart illustrating the process of a returning member switch of a fabric switch associating a unique identifier with the local switch, in accordance with an embodiment of the present invention.

FIG. 7B presents a flowchart illustrating the process of a returning member switch of a fabric switch associating a unique identifier with the local switch, in accordance with an embodiment of the present invention. During operation, the switch joins a fabric switch as a member switch (operation 752) and retrieves the previous local configuration of the switch (operation 754). The switch then obtains the switch identifier associated with the fabric switch from the retrieved configuration (operation 756) and associates the local switch with the obtained switch identifier (operation 758).

Virtual Link Aggregation

An end device coupled to a fabric switch can be multi-homed (i.e., can be coupled to the fabric switch via multiple links, optionally with multiple member switches). When an end device is coupled to multiple member switches via multiple links, these links can be aggregated to one virtual link aggregation. Ports participating in a virtual link aggregation operate as a single port and should have a single port status. To address this issue, only one of the ports of the virtual link aggregation is allowed to participate in a spanning tree at a time. However, this may lead to inefficient port selection because another port can become a more suitable port at a later time.

Figure 8A:
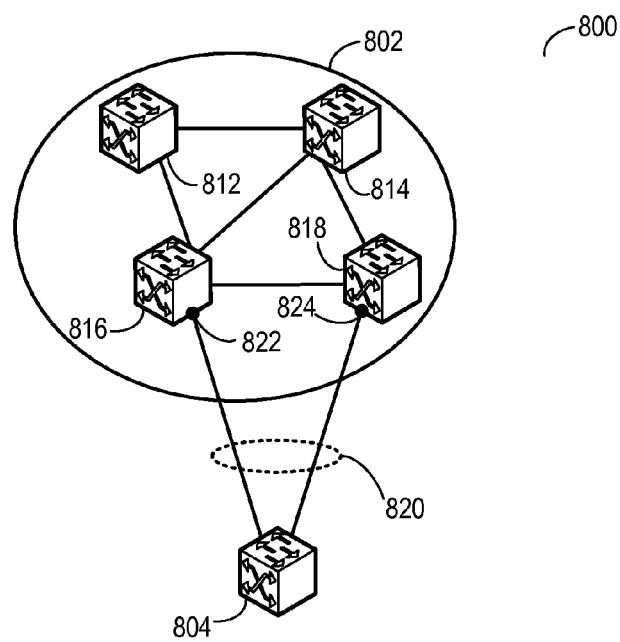
FIG. 8A illustrates an exemplary virtual link aggregation with spanning tree support, in accordance with an embodiment of the present invention.

FIG. 8A illustrates an exemplary virtual link aggregation with spanning tree support, in accordance with an embodiment of the present invention. A layer-2 network 800 includes fabric switch 802 and a switch 804. Fabric switch 802 includes member switches 812, 814, 816, and 818. Switch 804 is coupled to member switches 816 and 818 with virtual link aggregation 820. In this example, switch 804 can be considered an end device from fabric switch 802's perspective, and switches 816 and 818 are partner switches of virtual link aggregation 820. In some embodiments, fabric switch 802 can be a TRILL network and its member switches can be TRILL RBridges.

When switches 802 and 804 participate in a spanning tree, switch 804 views fabric switch 802 as a single switch. Switches 816 and 818 can be configured to operate in a special "trunked" mode for switch 804, where port 822 of switch 816 and port 824 of switch 818 operate as a single logical port of virtual link aggregation 820. As a result, the same port status should be associated with that logical port and have the same state transitions across a respective partner switch. This issue is addressed by allowing only one of the ports of virtual link aggregation 820 to actively participate in the spanning tree at a time. The switch that includes that port is referred to as the master switch. The edge port which receives the most recent proposal message is selected to participate in the spanning tree and the switch becomes the master switch. In other words, this selected port represents the logical port in the spanning tree.

Initially, the primary switch, which forwards multicast traffic via a virtual link aggregation, becomes the master switch. Suppose that switch 816 is the primary switch for virtual link aggregation 820. Hence, initially, switch 816 becomes the master switch; and port 822 participates in the spanning tree, sending and receiving BPDUs for the spanning tree. In other words, port 822 represents the logical port of virtual link aggregation 820 in the spanning tree. If switch 818 receives a BPDU via port 824, switch 818 becomes the master switch; and port 824 starts participating in the spanning tree, sending and receiving BPDUs for the spanning tree. In this way, BPDU is sent and received by the same node. In this way, no tunneling of BPDU to the primary switch is needed, and the transmit and receive state machines of the spanning tree protocol operate on the same member switch. Furthermore, if the current master switch of virtual link aggregation 820 becomes unavailable (e.g., due to a failure), another switch starts receiving BPDU and becomes the master switch.

Figure 8B:
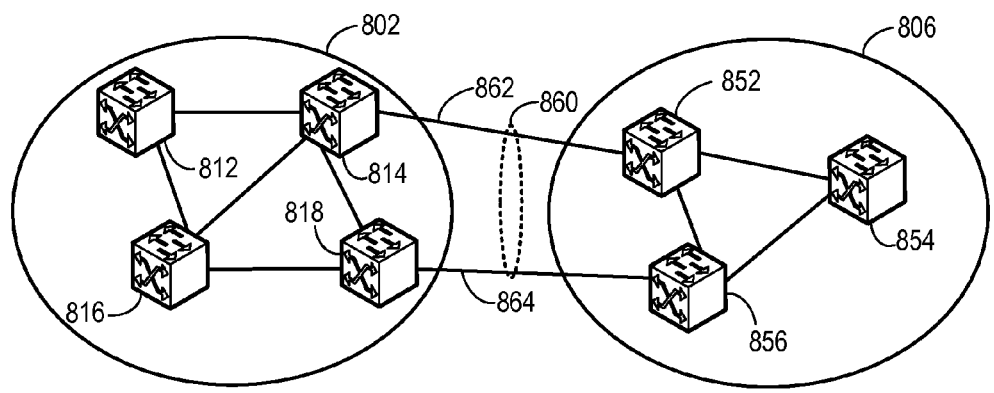
FIG. 8B illustrates an exemplary virtual link aggregation with spanning tree support between fabric switches, in accordance with an embodiment of the present invention.

FIG. 8B illustrates an exemplary virtual link aggregation with spanning tree support between fabric switches, in accordance with an embodiment of the present invention. In this example, in network 800, fabric switch 802 is coupled to fabric switch 806. Fabric switch 806 includes member switches 852, 854, and 856. Switch 814 is coupled to switch 852 via link 862, and switch 818 is coupled to switch 856 via link 864. Links 862 and 864 form a link aggregation 860 between fabric switches 802 and 806. In this case, both ends of virtual link aggregation are fabric switches. In this case, when fabric switches 802 and 806 are starting, both fabric switches 802 and 806 can receive BPDUs via non-primary switches. As a result, fabric switches 802 and 806 may chase each other, causing instability in network 800.

To solve this problem, the master switch is only changed in a fabric switch with an inferior fabric switch identifier (e.g., if the other fabric switch has a superior fabric switch identifier). Here, inferior or superior can be "greater than," "less than," or a combination thereof. For example, suppose that the fabric switch identifier of fabric switch 806 is inferior to the fabric switch identifier of fabric switch 802. Then the master switch is only changed in fabric switch 806. In this way, fabric switch 806 changes the master switch to match fabric switch 802. Suppose that the primary switch, and initial master switch, for virtual link aggregation 860 is switch 814 in fabric switch 802 and switch 856 in fabric switch 806. As a result, fabric switches 802 and 806 can both receive BPDUs via non-primary switches 818 and 852, respectively. However, only fabric switch 806 changes the master switch from primary switch 856 to switch 852. On the other hand, primary switch 814 remains the master switch in fabric switch 802. As a result, new master switch 852 of fabric switch 806 matches master switch 814 of fabric switch 802.

Figure 9:
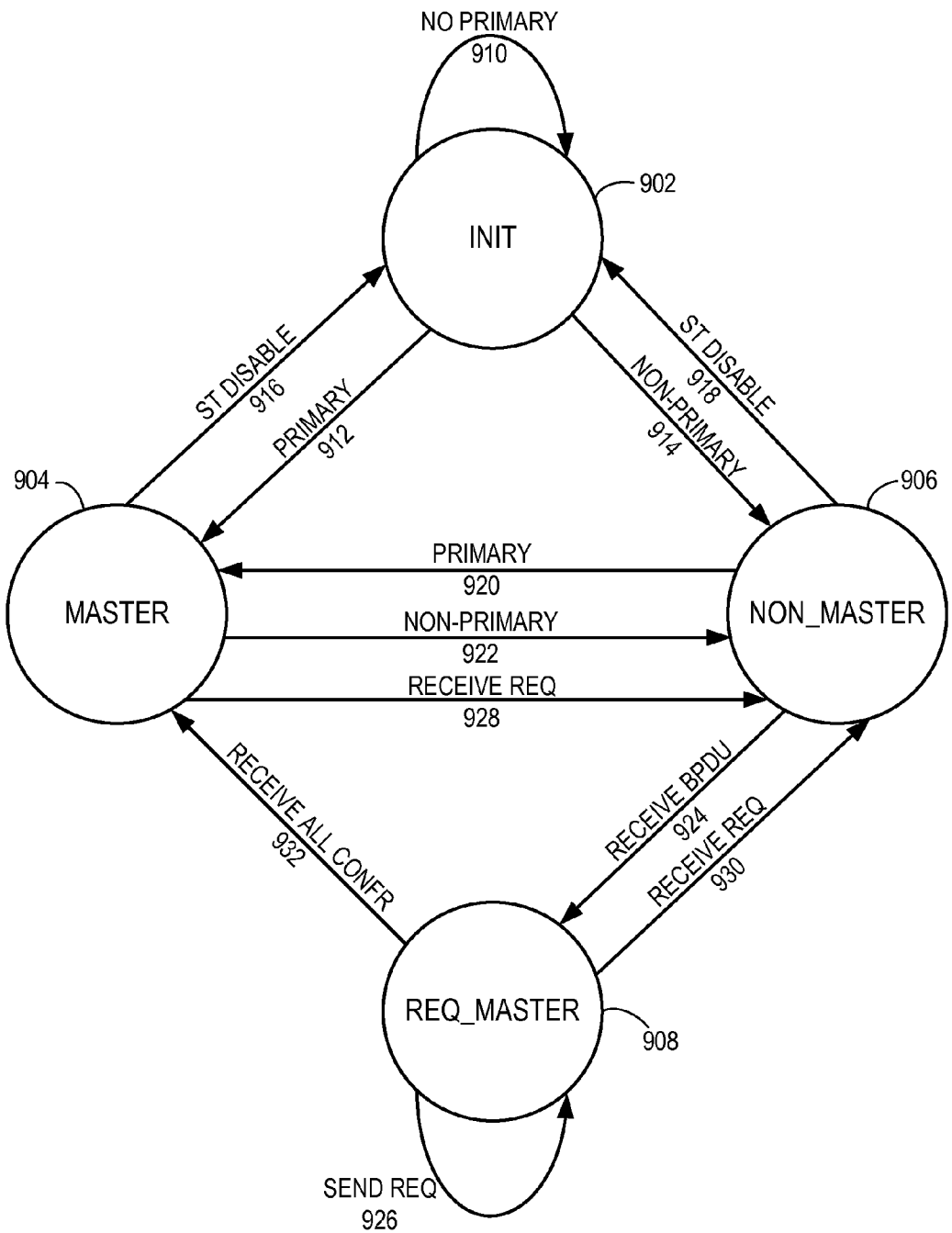
FIG. 9 illustrates an exemplary state diagram of a partner switch of a virtual link aggregation with spanning tree support, in accordance with an embodiment of the present invention.

FIG. 9 illustrates an exemplary state diagram of a partner switch of a virtual link aggregation with spanning tree support, in accordance with an embodiment of the present invention. Initially, the switch is in an INIT state 902. If no primary switch is configured for the virtual link aggregation, the switch remains in the INIT state (transition 910). If the switch is a primary switch, the switch transitions to a MASTER state 904 (transition 912). In this state, the switch becomes the master switch for the virtual link aggregation and is responsible for actively participating in the spanning tree, sending and receiving BPDUs. In some embodiments, the switch maintains different state diagrams for different instances of the spanning tree protocol (e.g., different instances can have different master switches). If the switch is a non-primary switch, the switch transitions to a NON_MASTER state 906 (transition 914). In this state, the switch does not actively participate in the spanning tree. If the switch is the MASTER or NON_MASTER state, and spanning tree is disabled, the switch transitions back to the INIT state (transitions 916 and 918, respectively).

If the switch is in the NON_MASTER state and becomes a primary switch, the switch transitions to the MASTER state (transition 920). Similarly, if the switch is in the MASTER state and becomes a non-primary switch, the switch transitions to the NON_MASTER state (transition 922). If the switch is in the NON_MASTER state and receives a BPDU, the switch transitions to a REQ_MASTER state 908 (transition 924). In this state, the switch sends a request to become a master switch to other partner switches while remaining in the REQ_MASTER state (transition 926). If the switch is in the MASTER state and receives the request, the switch transitions to the NON_MASTER state (transition 928). Similarly, if the switch is in the REQ_MASTER state and receives a request to become a master switch from another partner switch, the switch transitions to the NON_MASTER state (transition 930). Transition 930 allows the partner switch most recently receiving a BPDU to become the master switch. If the switch is in the REQ_MASTER state and receives confirmations from all other partner switches, the switch transitions to the MASTER state (transition 932).

Exemplary Switch System

Figure 10:
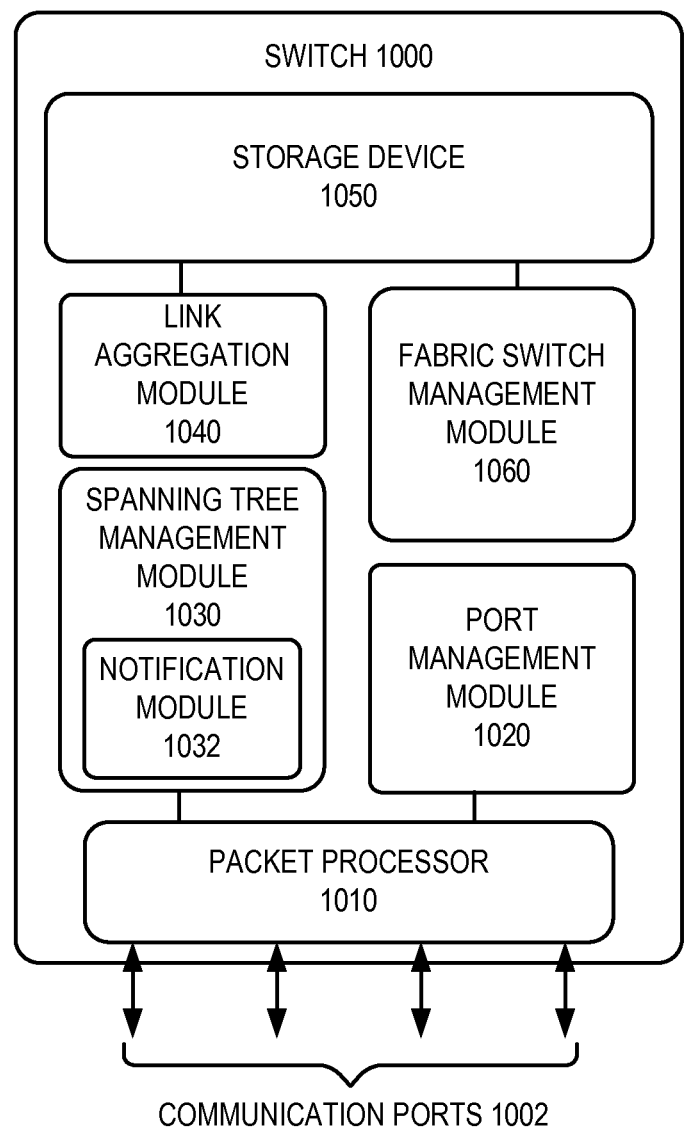
FIG. 10 illustrates an exemplary architecture of a switch with distributed spanning tree protocol support, in accordance with an embodiment of the present invention.

FIG. 10 illustrates an exemplary architecture of a switch with distributed spanning tree protocol support, in accordance with an embodiment of the present invention. In this example, a switch 1000 includes a number of communication ports 1002, a packet processor 1010, a spanning tree management module 1030, and a storage device 1050. Packet processor 1010 extracts and processes header information from the received frames.

In some embodiments, switch 1000 may maintain a membership in a fabric switch, as described in conjunction with FIG. 1A, wherein switch 1000 also includes a fabric switch management module 1060. In some embodiments, spanning tree management module 1030 represents the fabric switch as a single switch in a spanning tree. Fabric switch management module 1060 maintains a configuration database in storage device 1050 that maintains the configuration state of every switch within the fabric switch. Fabric switch management module 1060 maintains the state of the fabric switch, which is used to join other switches. In some embodiments, switch 1000 can be configured to operate in conjunction with a remote switch as an Ethernet switch. Under such a scenario, communication ports 1002 can include inter-switch communication channels for communication within a fabric switch. This inter-switch communication channel can be implemented via a regular communication port and based on any open or proprietary format. Communication ports 1002 can include one or more TRILL ports capable of receiving frames encapsulated in a TRILL header. Packet processor 1010 can process these TRILL-encapsulated frames.

During operation, packet processor 1010 obtains information associated with a spanning tree from a received message. Spanning tree management module 1030 checks whether the obtained information is superior to locally available information stored in storage device 1050 of the spanning tree, as described in conjunction with FIG. 2A. If so, spanning tree management module 1030 determines the port role of a local port, which is one of the communication ports of 1002, for the spanning tree to be the root port. Spanning tree management module 1030 also determines the port state of the local port for the spanning tree to be blocking. In some embodiments, switch 1000 includes a notification module 1032, which generates a notification message for a remote switch comprising the obtained information.

As described in conjunction with FIG. 2A, if switch 1000 receives an approval from a remote switch, spanning tree management module 1030 changes the port state of the local port for the spanning tree to be forwarding. On the other hand, if switch 1000 receives superior information of the spanning tree from a message, which is not a control message of the spanning tree, from a remote switch, spanning tree management module 1030 re-determines the port role of the local port for the spanning tree. Spanning tree management module 1030 stores the best locally available information of the spanning tree in a node root priority vector in storage device 1050 and the best information of the spanning tree associated with a remote switch in a local node root priority table in storage device 1050, as described in conjunction with FIGS. 1A and 1B. In some embodiments, the node root priority vector is stored in the node root priority table.

In some embodiments, switch 1000 also includes a port management module 1020, which assigns a fabric-switch-wide unique port identifier to the local port. Spanning tree management module 1030 uses this port identifier to participate in the spanning tree. Port management module 1020 stores the port identifier in an entry of a port identifier allocation table, which can be stored in storage device 1050. If a status update event occurs for switch 1000, port management module 1020 marks the entry as stale. When the effect of the status update event ends, port management module 1020 reassigns the port identifier to the local port, as described in conjunction with FIG. 4C.

If the number of port identifiers reaches its limit and the stale entry meets one or more reallocation criteria, port management module 1020 reassigns the port identifier of the stale entry to another port, as described in conjunction with FIG. 4D. Furthermore, if the number of port identifiers reaches its limit and no stale entry in the port identifier allocation table is available, port management module 1020 precludes switch 1000 from enabling the spanning tree for that other port. In some embodiments, fabric switch management module 1060 determines a switch identifier for the fabric switch. This switch identifier is distinct from the switch identifier of a second fabric switch, as described in conjunction with FIG. 6A.

In some embodiments, switch 1000 also includes a link aggregation module 1040, which operates the local port in conjunction with a second port of a remote switch as a single logical port of a virtual link aggregation. Link aggregation module 1040 also selects a master switch between switch 1000 and the remote switch. Link aggregation module 1040 can select the master switch based on whether a switch has received the most recent control message of the spanning tree, as described in conjunction with FIG. 8A. If switch 1000 is in a first fabric switch, and that first fabric switch is coupled to a second fabric switch, link aggregation module 1040 selects the master switch further based on whether a first identifier associated with the first fabric switch is inferior to a second identifier associated with the second fabric switch, as described in conjunction with FIG. 8B.

Note that the above-mentioned modules can be implemented in hardware as well as in software. In one embodiment, these modules can be embodied in computer-executable instructions stored in a memory which is coupled to one or more processors in switch 1000. When executed, these instructions cause the processor(s) to perform the aforementioned functions.

In summary, embodiments of the present invention provide a switch, a method and a system for facilitating external spanning tree support for a fabric switch. In one embodiment, the switch includes a packet processor and a spanning tree management module. The packet processor obtains information associated with a spanning tree from a message. The spanning tree management module, in response to the obtained information being superior to locally available information of the spanning tree, determines the port role of a local port of the switch for the spanning tree to be the root port and the port state of the local port for the spanning tree to be blocking.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
a packet processor configured to obtain information associated with a spanning tree from a notification message, wherein the switch participates in the spanning tree, and the obtained information includes a path cost to a root of the spanning tree; and
spanning tree management circuitry configured to:
determine whether the path cost in the obtained information is superior to a locally available path cost to the root;
in response to determining that the path cost in the obtained information is superior to the locally available path cost,
set a port role of a first port of the switch to be a root port and a port state of the first port to be blocking for the spanning tree.

2. The switch of claim 1, further comprising notification circuitry configured to generate a notification message for a remote switch comprising the obtained information.

3. The switch of claim 1, wherein the spanning tree management circuitry is further configured to change the port state of the first port for the spanning tree to be forwarding in response to identifying an approval from a remote switch.

4. The switch of claim 1, wherein the spanning tree management circuitry is further configured to re-set the port role of the first port for the spanning tree in response to obtaining superior path cost to the root of the spanning tree from a notification message from a remote switch, wherein the notification message is distinct from a control message of the spanning tree.

5. The switch of claim 1, wherein the spanning tree management circuitry is further configured to:
store information of the spanning tree associated with the switch in a first entry of a local node root priority table; and store information of the spanning tree associated with a remote switch in a second entry of the local node root priority table.

6. The switch of claim 1, further comprising fabric switch management circuitry configured to maintain a membership in a network of interconnected switches; and
wherein the spanning tree management circuitry is further configured to represent the network of interconnected switches as a single switch in the spanning tree.

7. The switch of claim 6, further comprising port management circuitry configured to assign a port identifier to the first port, wherein the port identifier is unique among edge ports of the network of interconnected switches; and
wherein the spanning tree management circuitry is further configured to use the port identifier to participate in the spanning tree, thereby facilitating the first port to appear as a port of the single switch in the spanning tree.

8. The switch of claim 7, wherein the port management circuitry is further configured to:
store the port identifier in an entry of a port identifier allocation table of the switch; and
mark the entry as stale in response to a status update event occurring for the switch; and
wherein other member switches of the network of interconnected switches are precluded from assigning the stale entry to an edge port.

9. The switch of claim 8, wherein the port management circuitry is further configured to reassign the port identifier to the first port in response to an ending of an effect of the status update event.

10. The switch of claim 8, wherein the port management circuitry is further configured to reassign the port identifier of the stale entry to a second port in response to reaching a limit of a number of port identifiers and the stale entry meeting one or more reallocation criteria.

11. The switch of claim 10, wherein the reallocation criteria include:
an age of a stale entry; and
an indication whether an entry is stale due to a configured event or a learned event.

12. The switch of claim 8, wherein the port management circuitry is further configured to preclude a second port of the switch from participating in a spanning tree in response to reaching a limit of a number of port identifiers and an unavailability of a stale entry in the port identifier allocation table.

13. The switch of claim 6, wherein the fabric switch management circuitry is further configured to determine a first switch identifier identifying the network of interconnected switches, wherein the first switch identifier is distinct from a second switch identifier identifying a second network of interconnected switches, and wherein the distinction between the first and the second switch identifiers is based on a random number or a configured number.

14. The switch of claim 1, further comprising link aggregation circuitry configured to:
operate the first port in conjunction with a third port of a remote switch as a single logical port of a virtual link aggregation; and
select a master switch between the switch and the remote switch, wherein the master switch includes a selected port between the first port and the third port, and wherein the selected port actively participates in the spanning tree as representative of the logical port.

15. The switch of claim 14, wherein the link aggregation circuitry is further configured to select the master switch based on whether a switch has received the most recent control message of the spanning tree.

16. The switch of claim 15, wherein the link aggregation circuitry is configured to select the master switch further based on whether a first identifier associated with the switch and the remote switch is inferior to a second identifier, wherein the first identifier is associated with a first network of interconnected switches and the second identifier is associated with a second network of interconnected switches.

17. A computer-executed method, comprising:
obtaining, by a switch, information associated with a spanning tree from a notification message, wherein the switch participates in the spanning tree, and the obtained information includes a path cost to a root of the spanning tree;
determining whether the path cost in the obtained information is superior to a locally available path cost to the root; and
in response to determining that the path cost in the obtained information is superior to the locally available path cost,
setting a port role of a first port of the switch to be a root port and a port state of the first port to be blocking for the spanning tree.

18. The method of claim 17, further comprising generating a notification message for a remote switch comprising the obtained information.

19. The method of claim 17, further comprising changing the port state of the first port for the spanning tree to be forwarding in response to identifying an approval from a remote switch.

20. The method of claim 17, further comprising re-setting the port role of the first port for the spanning tree in response to obtaining superior path cost to the root of the spanning tree from a notification message from a remote switch, wherein the notification message is distinct from a control message of the spanning tree.

21. The method of claim 17, further comprising:
storing information of the spanning tree associated with the switch in a first entry of a local node root priority table; and
store information of the spanning tree associated with a remote switch in a second entry of the local node root priority table.

22. The method of claim 17, further comprising:
maintaining a membership in a network of interconnected switches; and
representing the network of interconnected switches as a single switch in the spanning tree.

23. The method of claim 22, further comprising:
assigning a port identifier to the first port, wherein the port identifier is unique among edge ports of the network of interconnected switches; and
using the port identifier to participate in the spanning tree, thereby facilitating the first port to appear as a port of the single switch in the spanning tree.

24. The method of claim 23, further comprising:
storing the port identifier in an entry of a port identifier allocation table of the switch; and
marking the entry as stale in response to a status update event occurring for the switch;
wherein other member switches of the network of interconnected switches are precluded from assigning the stale entry to an edge port.

25. The method of claim 24, further comprising reassigning the port identifier to the first port in response to an ending of an effect of the status update event.

26. The method of claim 24, further comprising reassigning the port identifier of the stale entry to a second port in response to reaching a limit of a number of port identifiers and the stale entry meeting one or more reallocation criteria.

27. The method of claim 26, wherein the reallocation criteria include:
an age of a stale entry; and
an indication whether an entry is stale due to a configured event or a learned event.

28. The method of claim 24, further comprising precluding a second port of the switch from participating in a spanning tree in response to reaching a limit of a number of port identifiers and an unavailability of a stale entry in the port identifier allocation table.

29. The method of claim 22, further comprising determining a first switch identifier identifying the network of interconnected switches, wherein the first switch identifier is distinct from a second switch identifier identifying a second network of interconnected switches, and wherein the distinction between the first and the second switch identifiers is based on a random number or a configured number.

30. The method of claim 17, further comprising:
operating the first port in conjunction with a third port of a remote switch as a single logical port of a virtual link aggregation; and
selecting a master switch between the switch and the remote switch, wherein the master switch includes a selected port between the first port and the third port, and wherein the selected port actively participates in the spanning tree as representative of the logical port.

31. The method of claim 30, further comprising selecting the master switch based on whether a switch has received the most recent control message of the spanning tree.

32. The method of claim 31, further comprising selecting the master switch further based on whether a first identifier associated with the switch and the remote switch is inferior to a second identifier, wherein the first identifier is associated with a first network of interconnected switches and the second identifier is associated with a second network of interconnected switches.

33. A computer system, comprising:
a processor; and
a storage device coupled to the processor and storing instructions which when executed by the processor cause the processor to perform a method, the method comprising:
obtaining information associated with a spanning tree from a notification message, wherein the computer system participates in the spanning tree, and the obtained information includes a path cost to a root of the spanning tree;
determining whether the path cost in the obtained information is superior to a locally available path cost to the root; and
in response to determining that the path cost in the obtained information is superior to the locally available path cost,
setting a port role of a first port of the computer system to be a root port and a port state of the first port to be blocking for the spanning tree.

* * * * *